(12) United States Patent
Wang et al.

(10) Patent No.: US 10,972,986 B2
(45) Date of Patent: *Apr. 6, 2021

(54) METHOD AND USER EQUIPMENT FOR ALLOCATING UPLINK POWER IN A MOBILE COMMUNICATION SYSTEM

(71) Applicant: Samsung Electronics Co., Ltd., Suwon-si (KR)

(72) Inventors: Yi Wang, Beijing (CN); Shichang Zhang, Beijing (CN); Yingyang Li, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,609

(22) Filed: Apr. 16, 2020

(65) Prior Publication Data
US 2020/0245258 A1    Jul. 30, 2020

Related U.S. Application Data

(63) Continuation of application No. 16/653,341, filed on Oct. 15, 2019, now Pat. No. 10,631,250, which is a (Continued)

(30) Foreign Application Priority Data

May 15, 2015    (CN) .......................... 201510250520.2

(51) Int. Cl.
*H04W 52/14*    (2009.01)
*H04W 52/28*    (2009.01)
(Continued)

(52) U.S. Cl.
CPC ....... *H04W 52/146* (2013.01); *H04W 52/281* (2013.01); *H04W 52/34* (2013.01);
(Continued)

(58) Field of Classification Search
CPC . H04W 52/146; H04W 52/281; H04W 52/34; H04W 52/367; H04W 72/0473;
(Continued)

(56) References Cited

U.S. PATENT DOCUMENTS 7,139,284 B1    11/2006    Furukawa et al.
7,415,288 B1    8/2008    Hou et al.
(Continued)

FOREIGN PATENT DOCUMENTS

CN    102308640 A    1/2012
CN    103081528 A    5/2013
(Continued)

OTHER PUBLICATIONS

Chinese Office Action dated Apr. 1, 2020, issued in Chinese Application No. 201510250520.2.
(Continued)

*Primary Examiner* — Dominic E Rego
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure provides a power allocating method. A User Equipment (UE) receives power control indication information from a control node, obtains a power control mode, and/or, uplink transmission power configuration information. The UE allocates power for each uplink carrier, based on the power control mode, and/or, the uplink transmission power configuration information. By applying the
(Continued)

present disclosure, power waste generated in the following scene may be reduced. A scheduled uplink signal cannot be transmitted in a corresponding carrier due to a busy channel. Subsequently, uplink scheduling efficiency of the UE may be improved, and the whole network efficiency may also be enhanced.

20 Claims, 8 Drawing Sheets

Related U.S. Application Data continuation of application No. 16/384,352, filed on Apr. 15, 2019, now Pat. No. 10,448,340, which is a continuation of application No. 15/574,379, filed as application No. PCT/KR2016/005095 on May 13, 2016, now Pat. No. 10,264,533.

(51) Int. Cl.
| | |
|---|---|
| *H04W 52/34* | (2009.01) |
| *H04W 52/36* | (2009.01) |
| *H04W 72/04* | (2009.01) |
| *H04W 72/10* | (2009.01) |
| *H04W 72/12* | (2009.01) |

(52) U.S. Cl.
CPC ..... *H04W 52/367* (2013.01); *H04W 72/0473* (2013.01); *H04W 72/10* (2013.01); *H04W 72/0413* (2013.01); *H04W 72/1242* (2013.01)

(58) Field of Classification Search
CPC ............. H04W 72/10; H04W 72/0413; H04W 72/1242
See application file for complete search history.

(56) References Cited

U.S. PATENT DOCUMENTS

| 8,270,383 | B2 | 9/2012 | Lastinger et al. |
|---|---|---|---|
| 2001/0046213 | A1 | 11/2001 | Sakoda |
| 2004/0116127 | A1 | 6/2004 | Marinier et al. |
| 2005/0208960 | A1 | 9/2005 | Hassan |
| 2007/0019589 | A1 | 1/2007 | Attar et al. |
| 2008/0157184 | A1 | 7/2008 | Lai et al. |
| 2008/0220802 | A1 | 9/2008 | Yamanaka et al. |
| 2011/0038271 | A1 | 2/2011 | Shin et al. |
| 2011/0196547 | A1 | 8/2011 | Park et al. |
| 2011/0275403 | A1 | 11/2011 | Chen et al. |
| 2011/0287804 | A1 | 11/2011 | Seo et al. |
| 2011/0312331 | A1 | 12/2011 | Hakola et al. |
| 2011/0319120 | A1 | 12/2011 | Chen et al. |
| 2012/0224552 | A1 | 9/2012 | Feuersanger et al. |
| 2013/0051297 | A1 | 2/2013 | Kim et al. |
| 2013/0178221 | A1 | 7/2013 | Jung et al. |
| 2013/0215811 | A1 | 8/2013 | Takaoka et al. |
| 2013/0272257 | A1 | 10/2013 | Takaoka et al. |
| 2013/0324182 | A1 | 12/2013 | Deng et al. |
| 2013/0343301 | A1 | 12/2013 | Geirhofer et al. |
| 2014/0050205 | A1 | 2/2014 | Ann et al. |
| 2014/0105126 | A1 | 4/2014 | Soriaga et al. |
| 2014/0133449 | A1 | 5/2014 | Xu et al. |
| 2014/0321389 | A1 | 10/2014 | Zhang et al. |
| 2014/0329555 | A1 | 11/2014 | Gao et al. |
| 2014/0341175 | A1 | 11/2014 | Beale et al. |
| 2014/0369324 | A1 | 12/2014 | Lin et al. |
| 2015/0016561 | A1 | 1/2015 | Negus et al. |
| 2015/0055454 | A1 | 2/2015 | Yang et al. |
| 2015/0063245 | A1 | 3/2015 | Gao et al. |
| 2015/0208402 | A1 | 7/2015 | Hwang et al. |
| 2015/0215944 | A1 | 7/2015 | Kim et al. |
| 2015/0223235 | A1 | 8/2015 | Hwang et al. |
| 2015/0271761 | A1 | 9/2015 | Park |
| 2015/0282103 | A1 | 10/2015 | Immonen et al. |
| 2015/0319703 | A1 | 11/2015 | Kwon et al. |
| 2015/0327243 | A1 | 11/2015 | Yin et al. |
| 2016/0044606 | A1 | 2/2016 | Yin |

FOREIGN PATENT DOCUMENTS

| CN | 102573030 B | 11/2014 |
|---|---|---|
| WO | 2015/034299 A1 | 3/2015 |

OTHER PUBLICATIONS

3GPP TSG RAN WG1 Meeting #80. Analysis on potential issues and solutions for LAA UL transmission. ZTE, Discussion and Decision. R1-150156. Athens, Greece, Feb. 9-13, 2015. pp. 1-6.
3GPP TSG RAN WG1 Meeting #80. Discussion on UL transmission for LAA. Samsung. Discussion. R1-150368. Athens, Greece, Feb. 9-13, 2015. pp. 1-7.

METHOD AND USER EQUIPMENT FOR ALLOCATING UPLINK POWER IN A MOBILE COMMUNICATION SYSTEM

CROSS-REFERENCE TO RELATED APPLICATION(S)

This application is a continuation application of prior application Ser. No. 16/653,341, filed on Oct. 15, 2019, which is continuation of prior application Ser. No. 16/384,352, filed on Apr. 15, 2019, which has issued as U.S. Pat. No. 10,448,340 on Oct. 15, 2019, which is a continuation application of prior application Ser. No. 15/574,379, filed on Nov. 15, 2017, which has issued as U.S. Pat. No. 10,264,533 on Apr. 16, 2019, which is a U.S. National Stage application under 35 U.S.C. § 371 of an International application number PCT/KR2016/005095, filed on May 13, 2016, which is based on and claimed priority under 35 U.S.C. § 119(a) of a Chinese patent application number 201510250520.2, filed on May 15, 2015, in the State Intellectual Property Office of China, the disclosure of which is incorporated by reference herein in its entirety.

TECHNICAL FIELD

The present disclosure relates to a method for allocating uplink power and a corresponding user equipment (UE) in a mobile communication system.

BACKGROUND ART

To meet the demand for wireless data traffic having increased since deployment of 4G (4$^{th}$-Generation) communication systems, efforts have been made to develop an improved 5G (5$^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Accompanying with increasing sharp contradiction between outbreak of users' demands for high-bandwidth wireless services and scarce spectrum resources, mobile operators start to consider taking free licensed frequency bands (which may also be referred to as unlicensed frequency bands) as a supplement for licensed frequency bands. Thus, research about deploying long term evolution (LTE) on unlicensed frequency bands has been scheduled.

Third generation partnership project (3GPP) starts to research how to effectively improve the whole network frequency utilization, by performing an effective carrier aggregation on unlicensed frequency bands and licensed frequency bands, on the precondition that there is no significant impact on other technologies of unlicensed frequency bands. FIG. 1 is a schematic diagram illustrating a mutual networking scene of licensed frequency bands and unlicensed frequency bands.

Unlicensed frequency bands have generally been allocated for other applications, e.g., wireless fidelity (WiFi) of radar or 802.11 series. Thus, interference level on unlicensed frequency bands is uncertain. Subsequently, it is generally difficulty to guarantee quality of service (QoS) of LTE transmission. However, the unlicensed frequency bands may still be applied for data transmission with lower QoS requirements. Here, an LTE system deployed on the unlicensed frequency bands may be referred to as a license assisted access (LAA) system. How to avoid mutual interference between the LAA system and other wireless systems, such as radar, or WiFi, on the unlicensed frequency bands is a key problem. Clear channel assessment (CCA), which is a mechanism to avoid collision, is generally employed by the unlicensed frequency bands. Before transmitting a signal, a station (STA) must detect a wireless channel. When detecting that the wireless channel is idle, the STA may occupy the wireless channel and transmit the signal. The LAA system also needs to comply with a similar mechanism, so as to ensure a small interference to other signals. A simpler method is as follows. An LAA device (base station or terminal) may be dynamically opened or closed, based on a CCA result. That is, when detecting that a channel is idle, the LAA device may transmit a signal. When detecting that a channel is busy, the LAA device may not transmit a signal. In the LAA system, uplink transmission of a UE is still scheduled by a base station. When scheduling an uplink signal of a UE, a base station cannot predict whether the uplink signal of the UE can be transmitted in a scheduled subframe, due to different interferences suffered by the base station and the UE in different geographical locations. Besides, when receiving a subframe indicating the scheduling information, the UE also cannot predict whether there is an idle channel in the scheduled subframe, so as to transmit an uplink signal. When a UE works in a carrier aggregation mode, the uplink maximum transmission power is relevant with number of uplink carriers transmitted simultaneously. Since uplink transmission of carriers in the unlicensed frequency bands may not be determined before scheduling a subframe, in a more extreme case, the uplink transmission of carriers in the unlicensed frequency bands may be determined at the start edge of the scheduled subframe, the UE may determine a corresponding maximum uplink transmission power at the start edge of the scheduled subframe. That is, the UE cannot determine the maximum uplink transmission power in advance, and cannot determine whether the uplink transmission power controlled by the base station exceeds the maximum uplink transmission power, so as to allocate a corresponding power, e.g., reduce power of an uplink channel/signal with a lower priority. Besides, under the circumstances that not all the starting points of uplink subframes of carriers in the unlicensed frequency bands are aligned, for example, multiple carriers respectively belong to different timing advance groups (TAGs), when allocating power for a carrier with an earlier starting point of uplink subframe, the UE cannot determine whether a later carrier in the unlicensed frequency bands can be transmitted. Subsequently, the UE cannot determine whether it is necessary to reserve power for these later carriers. The foregoing is totally different from power adjustment in current LTE system. In the current LTE system, when receiving uplink scheduling information, a UE may determine total configured maximum output power $P_{CMAX}$ and/or configured maximum output power of each carrier $P_{CMAX,c}$. UE can determine whether it would be power limited and how to allocate the power. Thus, the UE has sufficient time to prepare for power allocation and transmission, e.g., the time is greater than 2 ms.

DISCLOSURE OF INVENTION

Due to uncertainty of uplink transmission of carriers in the unlicensed frequency bands of the LAA system, the base station may not effectively configure uplink power for a UE, and the UE may not timely adjust the uplink power or UE may unnecessarily scale the power of some UL carriers due to assumed power limitation. Subsequently, current method for adjusting the uplink power may not work normally. The uplink transmission efficiency may be reduced, when not being fully utilized, e.g. UE unnecessarily scale the power or eNB allocates power in a conservative way. Thus, for a UE working in the carrier aggregation mode, which is configured with at least one carrier in the unlicensed frequency bands, how to allocate uplink power is an urgent problem to be solved.

The present disclosure provides a power control method and a corresponding device, which may reduce power waste in the following scene under carrier aggregation mode. Scheduled uplink signals cannot be transmitted on a corresponding carrier due to a busy channel Subsequently, uplink scheduling efficiency of a UE may be improved, and the whole network efficiency may also be enhanced.

To achieve the foregoing objectives, the present disclosure employs the following technical solutions.

A power control method, including:

determining, by a UE, a priority of each uplink signal on an uplink carrier scheduled to be transmitted within an uplink subframe;

determining, by the UE, actual transmission power of each uplink signal on the uplink carrier based on the priority; and transmitting, by the UE, an uplink signal.

Preferably, the UE determines the priority of each uplink signal on the uplink carrier, based on a preset priority determination mode; or, the UE determines the priority of each uplink signal on the uplink carrier, based on a priority determination mode indicated by a power control mode issued by a base station.

Preferably, the method further includes: before determining the actual transmission power, determining, by the UE, an assumed uplink maximum transmission power of the uplink subframe, wherein the assumed uplink maximum transmission power exists when determining power of an uplink channel/signal of each uplink carrier; wherein determining the actual transmission power of each uplink signal on the uplink carrier includes: adjusting transmission power of each uplink signal on the uplink carrier, based on the priority and the assumed uplink maximum transmission power transmitting an uplink signal corresponding to each uplink carrier, based on the adjusted uplink transmission power of each uplink signal on the uplink carrier and a set uplink maximum transmission power, which is set when actually transmitting the uplink subframe; or, giving up transmitting the uplink signal.

Preferably, determining the actual transmission power of each uplink signal on the uplink carrier includes: adjusting power of each uplink signal on the uplink carrier, based on the priority and the uplink maximum transmission power of the uplink subframe; transmitting the uplink signal corresponding to each uplink carrier, based on the adjusted power; or, giving up transmitting the uplink signal.

Preferably, the method further includes: before determining the actual transmission power, determining, by the UE, an assumed uplink maximum transmission power of the uplink subframe, wherein the assumed uplink maximum transmission power exists when determining power of an uplink channel/signal of each uplink carrier; wherein determining the actual transmission power of each uplink signal on the uplink carrier includes: adjusting transmission power of each uplink signal on the uplink carrier, based on the priority and the assumed uplink maximum transmission power; performing a second-time adjustment on uplink transmission power of each uplink signal on the uplink carrier, based on the adjusted uplink transmission power of each uplink signal on the uplink carrier and an actual uplink maximum transmission power of the uplink subframe; and, transmitting the uplink signal based on a result of the second-time adjustment.

Preferably, the method further includes: before determining the actual transmission power, determining, by the UE, an assumed uplink maximum transmission power of the uplink subframe, wherein the assumed uplink maximum transmission power exists when determining power of an uplink channel/signal of each uplink carrier; wherein determining the actual transmission power of each uplink signal on the uplink carrier includes: adjusting power of each uplink signal on the uplink carrier, based on the priority, the assumed uplink maximum transmission power and an actual uplink maximum transmission power of the uplink subframe; and, transmitting the uplink signal based on the adjusted power.

Preferably, determining the actual transmission power of each uplink signal on the uplink carrier includes: adjusting, by the UE, power of each uplink signal on the uplink carrier, based on the priority and an actual uplink maximum transmission power; and transmitting, by the UE, the uplink signal based on the adjusted power.

Preferably, the priority determination mode includes: determining the priority based on a channel/signal type of each uplink carrier; for each uplink carrier of the same type, determining the priority based on a type of UCI in the uplink carrier; or, determining the priority based on a type of a cell associated with the uplink carrier; or, determining the priority based on the channel/signal type of each uplink carrier; for each uplink carrier of the same type, determining the priority based on the type of UCI in the uplink carrier; for each uplink carrier with the same UCI type, or for each uplink carrier without the UCI, determining the priority based on the carrier type, wherein the carrier type refers to a carrier in the licensed frequency bands, or a carrier in the unlicensed frequency bands; or, determining the priority based on the carrier type of each uplink carrier, wherein the carrier type refers to a carrier in the licensed frequency bands, or a carrier in the unlicensed frequency bands; for an uplink carrier in the licensed frequency bands, determining the priority based on the channel/signal type of the carrier; for an uplink carrier in the unlicensed frequency bands, determining the priority based on the channel/signal type of the carrier, alternatively, determining the priority based on sequence of starting point of each uplink subframe, or determining the priority based on time sequence for determining to execute uplink transmission of each uplink subframe; or, determining the priority based on sequence of uplink transmission timing of each uplink carrier; or, determining the priority based on time sequence for determining to execute a transmission operation of each uplink carrier; or, when a starting point of an uplink subframe of a carrier in the licensed frequency bands is earlier than that of a carrier in the unlicensed frequency bands, determining that the priority of the carrier in the licensed frequency bands is higher than that of the carrier in the unlicensed frequency bands; for a carrier in the unlicensed frequency bands, determining the priority based on the type of uplink channel/signal, alternatively, determining the priority based on sequence of starting point of each uplink subframe, or determining the priority based on the time sequence for determining to execute uplink transmission of each uplink subframe; when the starting point of an uplink subframe of a carrier in the licensed frequency bands is later than that of a carrier in the unlicensed frequency bands, determining the priority based on the channel/signal type of each uplink carrier.

Preferably, when determining the priority based on the time sequence for determining to execute the transmission operation of each uplink carrier, determining that time for executing the transmission operation of each carrier in the licensed frequency bands is the same; for each carrier in the licensed frequency bands, determining the priority based on the type of uplink channel/signal.

Preferably, the priority determination mode includes: determining the priority based on sequence of uplink transmission timing of each uplink carrier; or, determining the priority based on time sequence for determining to execute the transmission operation of each uplink carrier.

Preferably, the UE determines the assumed uplink maximum transmission power of the uplink subframe, based on a preset assumed uplink maximum transmission power determination mode; or, the UE determines the assumed uplink maximum transmission power of the uplink subframe, based on an assumed uplink maximum transmission power determination mode indicated by the power control mode issued by the base station; or, the UE determines the assumed uplink maximum transmission power based on an existing mode; or, the UE reports a reference value of the uplink maximum transmission power to the base station, and receives the assumed uplink maximum transmission power, which is configured by the base station for the UE based on the reference value of the uplink maximum transmission power.

Preferably, the assumed uplink maximum transmission power determination mode includes: determining the assumed uplink maximum transmission power, based on each uplink carrier scheduled in a downlink subframe; or, determining the assumed uplink maximum transmission power, based on each uplink carrier in the licensed frequency bands scheduled in the downlink subframe; or, determining the assumed uplink maximum transmission power, based on each uplink carrier with UCI in the unlicensed frequency bands and each uplink carrier in the licensed frequency bands, which are scheduled in the downlink subframe; or, determining the assumed uplink maximum transmission power, based on a carrier configured by the base station for calculating the uplink maximum transmission power; or, respectively calculating a corresponding assumed uplink maximum transmission power, based on different assumptions about whether each uplink carrier scheduled in the downlink subframe has been transmitted.

Preferably, the carrier configured by the base station for calculating the uplink maximum transmission power includes: a scheduled carrier in the licensed frequency bands, and a scheduled carrier in the unlicensed frequency bands with the smallest index number, or a scheduled carrier in the licensed frequency bands and scheduled N' carriers in the unlicensed frequency bands, $0 \leq N' \leq$ total number of carriers in the unlicensed frequency bands which have been scheduled, or multiple groups of scheduled carrier combinations.

Preferably, the UE determines the assumed uplink maximum transmission power of the uplink subframe, based on a preset assumed uplink maximum transmission power determination mode; or, the UE determines the assumed uplink maximum transmission power of the uplink subframe, based on an assumed uplink maximum transmission power determination mode indicated by the power control mode transmitted by the base station; or, the UE determines the assumed uplink maximum transmission power based on an existing mode; or, the UE reports a reference value of the uplink maximum transmission power to the base station, and receives the assumed uplink maximum transmission power, which is configured by the base station for the UE based on the reference value of the uplink maximum transmission power.

Preferably, the assumed uplink maximum transmission power determination mode includes: determining the assumed uplink maximum transmission power, based on a carrier in the unlicensed frequency bands and a carrier in the licensed frequency bands, which have passed a CCA detection earliest; or, determining the assumed uplink maximum transmission power, based on a carrier in the licensed frequency bands, and a carrier in the unlicensed frequency bands, which have successfully finished the CCA detection before a scheduled uplink subframe in a TAG with the earliest uplink transmission timing.

Preferably, the method further includes: when adjusting the transmission power of each uplink signal on the uplink carrier, if a sum of uplink transmission power configured by the base station for each scheduled uplink carrier of the UE does not exceed the assumed uplink maximum transmission power, keeping the uplink transmission power configured by the base station for each uplink carrier unchanged; otherwise, adjusting the transmission power based on a preset power adjustment mode, or a power adjustment mode in the power control mode; wherein the power adjustment mode includes: mode 1: sorting each uplink carrier based on priority thereof, the adjusted power of first N uplink carriers is the same as the uplink transmission power configured by the base station for a corresponding carrier; for the other uplink carriers, allocating the remaining power of the UE to N+1 uplink carriers, or, allocating the remaining power to N+1 uplink carrier and another uplink carrier with the same priority, reducing the transmission power configured by the base station for a corresponding carrier in equal proportion; for an uplink carrier with lower priority, an adjusted power value is 0; wherein N is a maximum number of uplink carriers, to which the power has been allocated based on the uplink transmission power configured by the base station, after being sorted based on the priority, when current uplink maximum transmission power of the UE has not been exceeded; or, mode 2: respectively sorting carriers in the licensed frequency bands and carriers in the unlicensed frequency bands of each uplink carrier, based on the priority; for a carrier in the licensed frequency bands, determining the adjusted transmission power of each carrier in the licensed frequency bands, based on a priority sequence, wherein sum of the adjusted transmission power of each carrier in the licensed frequency bands is not allowed to exceed (the assumed uplink maximum transmission power-sum of power reserved for an carrier in the unlicensed frequency bands); for a carrier in the unlicensed frequency bands, determining the adjusted transmission power of each carrier in the unlicensed frequency bands, based on the priority sequence, wherein sum of the adjusted transmission power of each carrier in the unlicensed frequency bands is not allowed to exceed (the assumed uplink maximum transmission power-sum of power reserved for a carrier in the licensed frequency bands); or, mode 3: sorting each uplink carrier based on the priority, respectively determining multiple sets of adjusted transmission power for each uplink carrier, on the basis of whether each scheduled carrier in the unlicensed frequency bands has been transmitted.

Preferably, the method further includes: under the circumstances that the priority determination mode at least includes the priority of a carrier in the licensed frequency bands is higher than that of a carrier in the unlicensed frequency bands, and the power adjustment mode is mode 1, when adjusting the power, adjusting the power of a carrier in the licensed frequency bands based on an existing mode, firstly guaranteeing the power of the carrier in the licensed frequency bands, and adjusting the power of a carrier in the unlicensed frequency bands, such that sum of power of carriers in the licensed frequency bands and power of carriers in the unlicensed frequency bands is less than, or equal to the assumed uplink maximum transmission power.

Preferably, the power reserved for the carrier in the unlicensed frequency bands is the total power reserved for all the carriers in the unlicensed frequency bands, or, corresponding power reserved for each carrier in the unlicensed frequency bands, or, the power reserved for each carrier group in the unlicensed frequency bands, or, the corresponding power reserved for each carrier in the unlicensed frequency bands, based on a type of a channel transmitted by each carrier in the unlicensed frequency bands; wherein the power reserved for the carrier in the licensed frequency bands is the total power reserved for all the carriers in the licensed frequency bands, or the corresponding power reserved for each carrier in the licensed frequency bands, or the corresponding power reserved for each carrier group in the licensed frequency bands, or the corresponding power reserved for each carrier in the licensed frequency bands, based on a type of a channel transmitted by each carrier in the licensed frequency bands.

Preferably, the method further includes: when the sum of power reserved for the licensed frequency bands has exceeded the sum of power configured by the base station for the licensed frequency bands, taking the sum of power configured by the base station for the licensed frequency bands as a sum of reserved power for the licensed frequency bands; when the sum of power reserved for the unlicensed frequency bands has exceeded the sum of power configured by the base station for the unlicensed frequency bands, taking the sum of power configured by the base station for the unlicensed frequency bands as a sum of reserved power for the unlicensed frequency bands.

Preferably, transmitting the uplink signal corresponding to each uplink carrier, or giving up transmitting the uplink signal includes: when the set uplink maximum transmission power during an actual transmission of the uplink subframe is less than the assumed uplink maximum transmission power, for a carrier in the licensed frequency bands with an adjusted non-zero uplink transmission power, and for each carrier in the unlicensed frequency bands being successfully finished CCA detection, giving up an uplink signal transmission of a corresponding uplink carrier based on an ascending order of the priority, such that the total power of each transmitted uplink carrier does not exceed the set uplink maximum transmission power during the actual transmission of the uplink subframe; for an uplink carrier with adjusted uplink transmission power 0, giving up transmitting the uplink signal thereof; or, transmitting a signal of each scheduled uplink carrier with adjusted non-zero transmission power, which has successfully finished CCA detection, calculating remaining power after transmitting, and transmitting a signal of an uplink carrier with adjusted transmission power 0, for which the transmission power configured by the base station is less than the remaining power.

Preferably, transmitting the uplink signal corresponding to each uplink carrier, or giving up transmitting the uplink signal includes: for a carrier with adjusted non-zero power in the licensed frequency bands, transmitting the uplink signal in the corresponding carrier; for a carrier with adjusted non-zero power in the unlicensed frequency bands, which successfully finished the CCA detection, transmitting the uplink signal in the corresponding carrier; for an uplink carrier with adjusted uplink transmission power 0, giving up transmitting the uplink signal; or, when sum of power of a carrier with adjusted non-zero power in the licensed frequency bands and power of a carrier with adjusted non-zero power being successfully finished the CCA detection in the unlicensed frequency bands is still less than the uplink maximum transmission power, transmitting each uplink carrier with adjusted transmission power 0 based on a descending order of the priority.

Preferably, transmitting the uplink signal corresponding to each uplink carrier, or giving up transmitting the uplink signal includes: when the power adjustment mode is to determine multiple sets of adjusted transmission power, on the basis of whether each scheduled carrier in the unlicensed frequency bands has been transmitted, selecting, by the UE, a set of adjusted transmission power from the multiple sets of adjusted transmission power, based on the set uplink maximum transmission power during the actual transmission of the uplink subframe, and transmitting the signal based on a selection result.

Preferably, adjusting the power of each uplink carrier includes: determining the uplink maximum transmission power for a carrier in the licensed frequency bands, based on the priority, each carrier in the licensed frequency bands and a carrier in the unlicensed frequency bands, which has been determined as transmissible before uplink transmission of the carrier in the licensed frequency bands, and adjusting the power of the carrier in the licensed frequency bands based on the uplink maximum transmission power; determining the uplink maximum transmission power for a carrier in the unlicensed frequency bands, based on the priority, each carrier in the licensed frequency bands, and a carrier in the unlicensed frequency bands, which has been determined as transmissible before the uplink transmission of the carrier in the unlicensed frequency bands, and adjusting the power of the carrier in the unlicensed frequency bands, based on the uplink maximum transmission power.

Preferably, the method further includes: when the assumed uplink maximum transmission power is determined at that time, allowing a dynamic change.

Preferably, the method further includes: before the UE determines the priority of each uplink carrier, reporting, by the UE, a processing capability for adjusting the power to the base station, and receiving the power control mode configured by the base station based on the processing capability; determining, by the UE, the priority of each uplink carrier based on the configured power control mode, and/or, determining, by the UE, the priority of each uplink carrier based on the power control mode, when determining the actual transmission power; wherein the power control mode includes the priority determination mode, the assumed uplink maximum transmission power determination mode, and/or, a power allocating mode.

Preferably, the method further includes: before determining the priority, receiving, by the UE, a TAG and a TA configured by the base station, wherein the TAG and the TA guarantee that a starting point of an uplink subframe of each carrier in the unlicensed frequency bands is not later than that of a carrier in the licensed frequency bands.

Preferably, the method further includes: before determining the priority and the assumed uplink maximum transmission power, receiving, by the UE, a CCA time of a carrier in the unlicensed frequency bands configured by the base station, so as to guarantee that a CCA end time of each carrier in the unlicensed frequency bands is not later than that of a carrier in the licensed frequency bands.

A power control device, including a priority determining unit, an assumed maximum uplink transmission power determining unit, an actual transmission power determining unit and a transmitting unit, wherein the priority determining unit is to determine a priority of each uplink signal on an uplink carrier transmitted in a same subframe; the assumed uplink maximum transmission power determining unit is to determine an assumed uplink maximum transmission power of the subframe; the actual transmission power determining unit is to determine an actual transmission power of each uplink carrier, based on the priority and the assumed uplink maximum transmission power; and, the transmitting unit is to transmit an uplink signal based on the actual transmission power.

Based on the foregoing technical solutions, it can be seen that, the UE in the present disclosure determines the priority of each scheduled uplink transmission carrier, and the assumed maximum uplink transmission power $P_{CMAX}$ of a corresponding uplink subframe. The UE determines the actual transmission power of each uplink transmission carrier, based on the priority and assumed $P_{CMAX}$. And then, the UE transmits uplink signals. In foregoing modes, by using the priority and assumed $P_{CMAX}$, power may be allocated for multiple different uplink transmission carriers orderly. Subsequently, power waste occurred in the following scene may be reduced. Scheduled uplink signals cannot be transmitted on a corresponding carrier due to a busy channel Thus, uplink scheduling efficiency of the UE will be improved, and the whole network efficiency will also be enhanced.

MODE FOR THE INVENTION

To make objectives, technical solutions and advantages of the present disclosure more clear, detailed descriptions for the present disclosure will be provided in the following, accompanying with attached figures and embodiments.

Basic flow in the power control method of the present disclosure includes the following blocks.

In block 1, a UE determines a priority of each uplink signal on uplink carrier scheduled to be transmitted by a same downlink subframe.

In block 2, the UE determines an actual transmission power of each uplink signal on the uplink carrier, and transmits uplink signals, based on the priority determined in block 1. The uplink signals refer to uplink channels and/or uplink reference signals.

Specific implementations of the power control method in the present disclosure will be described in the following, accompanying with several embodiments.

Embodiment 1

In the embodiment, a specific mode for determining the actual transmission power of each uplink signal on an uplink carrier and transmitting uplink signals is as follows. Adjust transmission power of each uplink signal on the uplink carrier, based on the priority and assumed maximum uplink transmission power. It should be noted that, although maximum uplink transmission power is represented with total configured maximum output power $P_{CMAX}$ in several Embodiments of the present disclosure, the maximum uplink transmission power in the present disclosure actually includes $P_{CMAX}$, and/or configured maximum output power for serving cell c $P_{CMAX,c}$. Transmit an uplink signal corresponding to each uplink carrier, or give up transmitting the uplink signal, based on the adjusted uplink transmission power of each uplink carrier and a set $P_{CMAX}$ and/or $P_{CMAX,c}$ when actually transmitting an uplink subframe.

Preferably, the assumed $P_{CMAX}$ and/or $P_{CMAX,c}$ should be the same with set $P_{CMAX}$ and/or $P_{CMAX,c}$ when actually transmitting an uplink subframe.

Preferably, the assumed $P_{CMAX}$ and/or $P_{CMAX,c}$ could be different than set $P_{CMAX}$ and/or $P_{CMAX,c}$ when actually transmitting an uplink subframe.

Figure 1:
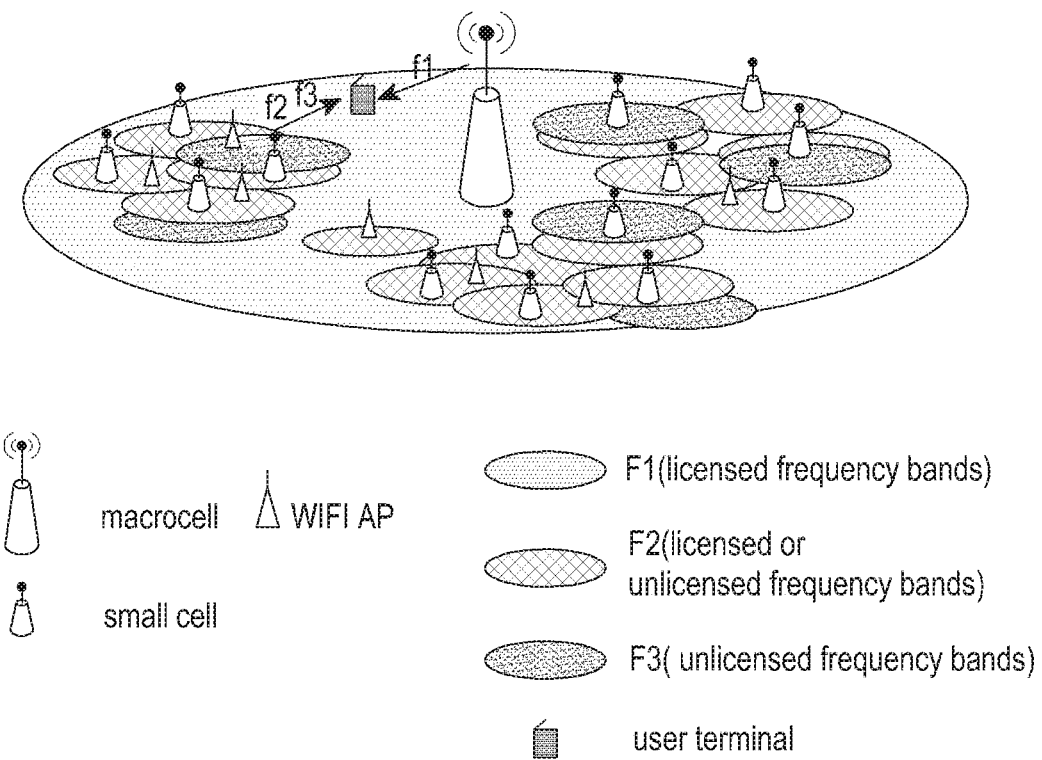
FIG. 1 is a schematic diagram illustrating a mutual networking scene of licensed frequency bands and unlicensed frequency bands.
Figure 2:
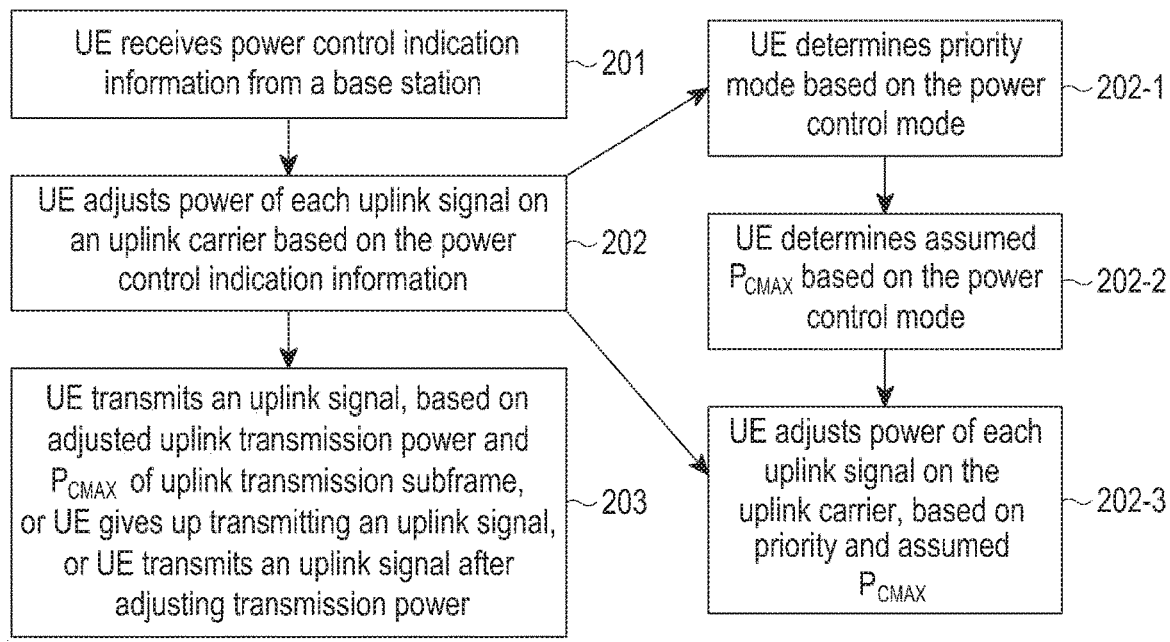
FIG. 2 is a flowchart illustrating a power control method in accordance with Embodiment 1 of the present disclosure.

Specific flow in the power control method of the embodiment is shown in FIG. 2, which includes the following blocks.

In block 201, a UE receives power control indication information from a control node, obtains a power control mode, and/or, power adjustment information.

In block 202, the UE adjusts power of an uplink carrier, based on the power control mode, and/or, the power adjustment information.

Preferably, the subframe index of each uplink carrier could be different, while these uplink carriers are overlapped in the time domain.

To implement block 202, the following blocks will be executed.

In block 202-1, the UE determines a priority mode based on the power control mode.

In block 202-2, the UE determines an assumed $P_{CMAX}$ and/or $P_{CMAX,c}$ based on the power control mode.

In block 202-3, the UE adjusts power of an uplink carrier, based on the priority and assumed $P_{CMAX}$ and/or $P_{CMAX,c}$.

Either of block 202-1 and block 202-2 may be executed firstly.

In block 203, the UE transmits an uplink signal, or gives up transmitting the uplink signal, based on the uplink transmission power determined in block 202 and the $P_{CMAX}$ and/or $P_{CMAX,c}$ of uplink transmission subframes.

The control node may be a base station or a UE, which plays a control role in a communication process. In the embodiment, descriptions will be provided by taking the base station as the control node.

The power control indication information will be described in the following, accompanying with two different cases.

In a first case, the power control indication information is to indicate the power control mode and power adjustment information. The power control mode will be described firstly. In the embodiment, predefine multiple kinds of power control modes. The power control indication information indicates a selected power control mode. A specific power control mode at least includes a priority determination mode, and/or, an assumed $P_{CMAX}$ and/or $P_{CMAX,c}$ determination mode, and/or, power allocation mode information. That is, information included in different power control modes is not exactly the same. For example, the power control mode may only include the priority determination mode and power allocation mode. In the specific descriptions as follows, assume that the power control mode includes the priority determination mode, the assumed $P_{CMAX}$ and/or $P_{CMAX,c}$ determination mode and the power allocation mode.

Detailed descriptions about specific implementations of blocks 202 and 203 in FIG. 2 will be provided in the following.

Specific implementation of block 202-1 is as follows.

In block 202-1, the UE determines the priority determination mode based on the power control mode. Specifically, different power control modes may include same or different priority determination modes. Specific priority determination mode may be as follows.

(1) Determine the priority based on a type of uplink channel/signal. For example, priority of physical uplink control channel (PUCCH)>priority of physical uplink shared channel (PUSCH) with uplink control information (UCI)>priority of PUSCH without UCI. Further subdivide the priority of a same type of uplink channel/signal based on type of UCI of an uplink channel, e.g. hybrid automatic repeat request (HARQ)-acknowledgement (ACK)=scheduling request (SR)>channel state information (CSI). Priorities of periodic CSI and aperiodic CSI are the same. Alternatively, priority of the aperiodic CSI is higher than that of the periodic CSI. For example, when multiple carriers transmit PUCCH of the same type, priority of primary cell (Pcell) is higher than that of other primary secondary cells (pScells). Alternatively, priority of a carrier of a macro evolved node B (MeNB) is higher than that of a carrier of a second evolved node B (SeNB). The priority of each PUSCH without UCI of a same evolved node B (eNB) is the same.

Preferably, when the foregoing priorities are the same, further determine the priority, based on time sequence of uplink transmission timing; or, further determine the priority based on time sequence for determining allowable uplink transmission of each uplink subframe. That is, priority of an uplink carrier with an earlier starting point of an uplink subframe is higher. Alternatively, priority of an uplink carrier with an earlier determined uplink transmission timing is higher.

(2) Determine the priority based on the type of uplink channel/signal. Further subdivide the priority of uplink channel/signal with the same type, based on the UCI type of each uplink channel. When the UCI type of each uplink channel is the same, or there is no UCI, further subdivide the priority of uplink channel/signal with the same type based on carrier type. The carrier type here refers to a carrier in the licensed frequency bands, or refers to a carrier in the unlicensed frequency bands. For example, priority of a carrier in the licensed frequency bands is higher than that of a carrier in the unlicensed frequency bands.

Preferably, when the foregoing priorities are the same, further determine the priority, based on time sequence of uplink transmission timing; or, further determine the priority based on time sequence for determining allowable uplink transmission of each uplink subframe. That is, priority of an uplink carrier with an earlier starting point of an uplink subframe is higher. Alternatively, priority of an uplink carrier with an earlier determined uplink transmission timing is higher.

(3) Determine the priority based on carrier type. For example, priority of a carrier in the licensed frequency bands is higher than that of a carrier in the unlicensed frequency bands. For each carrier in the licensed frequency bands, determine the priority based on the type of uplink channel/signal. For each carrier in the unlicensed frequency bands, determine the priority based on one of the following modes.

Determine the priority based on the type of uplink channel/signal.

Preferably, when the type of uplink channel/signal is the same, the priority thereof is also the same.

Preferably, when the type of uplink channel/signal is the same, further determine the priority, based on time sequence of uplink transmission timing; or, further determine the priority based on time sequence for determining allowable uplink transmission of each uplink subframe. That is, priority of an uplink carrier with an earlier starting point of an uplink subframe is higher. Alternatively, priority of an uplink carrier with an earlier determined uplink transmission timing is higher.

Determine the priority, based on time sequence of uplink transmission timing, or based on time sequence for determining allowable uplink transmission of each uplink subframe. That is, priority of an uplink carrier with an earlier starting point of an uplink subframe is higher. Alternatively, priority of an uplink carrier with an earlier determined uplink transmission timing is higher.

Preferably, when the uplink transmission timing is aligned (e.g. in the same TAG), or when the time for determining the allowable uplink transmission of each uplink subframe is the same, the priority is the same.

Preferably, when the uplink transmission timing is aligned, or when the time for determining the allowable uplink transmission of each uplink subframe is the same, further determine the priority based on the type of uplink channel/signal.

(4) Determine the priority based on sequence of uplink transmission timing. For example, priority of an uplink channel/signal with an earlier starting point of uplink subframe is higher than that of an uplink channel/signal with a later starting point of uplink subframe. When starting point of each uplink subframe is aligned, sort based on another priority criteria, e.g., one of (1) to (3).

When only one TAG has been configured for a UE, transmission time of each uplink carrier is the same. Sort based on another priority criteria.

When multiple TAGs have been configured for a UE, and multiple uplink carriers scheduled within one subframe belong to at least two TAGs, priority of an uplink carrier of a TAG with an earlier starting point of uplink subframe is higher than that of an uplink carrier of a TAG with a later starting point of uplink subframe.

(5) Determine the priority based on time sequence for determining to execute transmission operation. For example, priority of an uplink channel/signal with an earlier time for determining to execute the transmission operation is higher than that of an uplink channel/signal, which possesses a later time for determining to execute the transmission operation.

Within one subframe, priority of an uplink carrier in the licensed frequency bands, or priority of an uplink carrier with an earlier starting point of uplink subframe in the licensed frequency bands is the highest for the following reasons. For an uplink carrier in the licensed frequency bands, determine uplink transmission thereof when a UE receives an uplink (UL) grant. For an uplink carrier in the unlicensed frequency bands, determine the uplink transmission thereof after a UE receives the UL grant and passes the CCA detection. That is, the time for determining allowable transmission of an uplink carrier in the unlicensed frequency bands is later.

Preferably, consider that the time for determining allowable transmission of a carrier in the licensed frequency bands is earlier than that of a carrier in the unlicensed frequency bands.

Preferably, under the circumstances that carrier j in the licensed frequency bands has not been transmitted, when determining that carrier i in the unlicensed frequency bands may be transmitted after passing the CCA detection, consider that the time for determining allowable transmission of these two carriers is the same.

Preferably, when considering that the time for determining to execute the transmission operation of each carrier in the licensed frequency bands is the same, determine the priority only based on the type of uplink channel/signal. For example, in a time division duplexing (TDD) system, a UL grant corresponding to each carrier in the licensed frequency bands transmitted in one uplink subframe may be transmitted in a different downlink subframe. However, in the embodiment, when the type of uplink channel/signal is the same, consider that the priority of the carrier in the licensed frequency bands is the same.

Preferably, confirm the time for determining to execute the transmission operation of each carrier in the licensed frequency bands, based on time sequence of receiving the UL grant or receiving a downlink (DL) grant.

Within one subframe, priority of an uplink carrier firstly passing the CCA detection in the unlicensed frequency bands is higher than that of an uplink carrier passing the CCA detection later in the unlicensed frequency bands. For example, when the uplink employs a Load based equipment (LBE), such as LBT category 4 used by LAA DL, or time starting point of CCA detection of each Frame based equipment (FBE) in different uplink carriers is different, some uplink carriers may pass the CCA detection earlier, or confirm whether some uplink carriers have passed the CCA detection earlier, so as to determine whether to execute the uplink transmission more earlier. The following scene may occur in this mode. An uplink subframe in a TAG, to which a carrier passing the CCA detection earlier belongs, has a later starting point. For example, even if a carrier CC1 in the unlicensed frequency bands belongs to a TAG with a later starting point of an uplink subframe, while a carrier CC2 in the unlicensed frequency bands belongs to a TAG with an earlier starting point of an uplink subframe, when the time for determining allowable uplink transmission of CC1 passing the CCA detection is earlier, priority of CC1 is higher than that of CC2. When the respective time for determining the allowable transmission of CC1 and CC2 is the same, sort based on another priority criteria, e.g., one of (1) to (4).

(6) When the starting point of an uplink subframe of a carrier in the licensed frequency bands is earlier than that of a carrier in the unlicensed frequency bands, priority of the carrier in the licensed frequency bands is higher than that of the carrier in the unlicensed frequency bands, based on the method illustrated with (3). Determine the priority among carriers in the licensed frequency bands based on the prior art. Determine the priority among carriers in the unlicensed frequency bands based on one of the following modes.

Determine the priority based on the type of uplink channel/signal.

Preferably, when the type of uplink channel/signal is the same, the priority is the same.

Preferably, when the type of uplink channel/signal is the same, further determine the priority based on time sequence of starting point of each uplink subframe, or further determine the priority based on sequence of time for determining allowable uplink transmission. That is, priority of an uplink carrier with an earlier starting point of uplink subframe is higher. Alternatively, priority of an uplink carrier with an earlier time for determining allowable uplink transmission is higher.

Determine the priority based on time sequence of starting point of each uplink subframe, or determine the priority based on sequence of time for determining allowable uplink transmission. That is, priority of an uplink carrier with an earlier starting point of uplink subframe is higher. Alternatively, priority of an uplink carrier with an earlier time for determining allowable uplink transmission is higher Preferably, when the starting point of each uplink subframe is aligned, the priority of each uplink subframe is the same. Alternatively, when the time for determining allowable uplink transmission of each uplink subframe is the same, the priority of each uplink subframe is the same.

Preferably, when the starting point of each uplink subframe is aligned, or when the time for determining allowable uplink transmission of each uplink subframe is the same, further determine the priority based on the type of uplink channel/signal.

When starting point of an uplink subframe of a carrier in the licensed frequency bands is later than or equal to that of a carrier in the unlicensed frequency bands, determine the priority based on (1) or (2).

For example, a carrier CC1 in the licensed frequency bands, which transmits a PUSCH without UCI, belongs to TAG1. The starting point of uplink subframe of CC1 is earlier. A carrier CC2 in the unlicensed frequency bands, which transmits a PUSCH with UCI, belongs to TAG2. The starting point of uplink subframe of CC2 is later. The priority of carrier CC1 in the licensed frequency bands is higher than that of carrier CC2 in the unlicensed frequency bands. For another example, carrier CC1 in the licensed frequency bands transmits a PUSCH without UCI, belongs to TAG1. The starting point of uplink subframe of CC1 is later. Carrier CC2 in the unlicensed frequency bands, which transmits a PUSCH with UCI, belongs to TAG2. The starting point of uplink subframe of CC2 is earlier. Since priority of PUSCH with UCI>priority of PUSCH without UCI, priority of carrier CC1 in the licensed frequency bands is lower than that of carrier CC2 in the unlicensed frequency bands.

The power control indication information may employ downlink radio resource control (RRC) signaling, downlink media access control (MAC) signaling, or physical (PHY) layer signaling. Specifically, processes at the side of a control node may be as follows.

In block a: a control node issues power control indication information to a UE.

The power control indication information includes a power control mode, which is to indicate the priority determination mode, and/or the assumed $P_{CMAX}$ and/or $P_{CMAX,C}$ determination mode, and/or, the power adjustment mode. The power control indication information may employ downlink RRC signaling, downlink MAC signaling, or physical layer signaling.

In block b: the control node receives an uplink signal from the UE.

Specific implementation of block 202-2 is as follows.

In block 202-2, the UE confirms the assumed $P_{CMAX}$ and/or $P_{CMAX,C}$ determination mode, based on the power control mode. Specifically, different power control modes may include same or different assumed $P_{CMAX}$ and/or $P_{CMAX,C}$ determination modes. The assumed $P_{CMAX}$ determination mode may be as follows. The assumed $P_{CMAX}$ and/or $P_{CMAX,C}$ determination mode exists, when the UE determines the power of uplink channel/signal of each uplink carrier. Specific assumed $P_{CMAX}$ determination mode may be as follows.

(1) The UE determines the assumed $P_{CMAX}$ and/or $P_{CMAX,C}$, based on each scheduled uplink carrier.

For example, the UE determines the $P_{CMAX}$ and/or $P_{CMAX,C}$ of uplink subframe n in subframe m. Subframe m is before subframe n. At this time, the UE has already successfully decoded a UL grant, which schedules uplink subframe n of carrier CC1 in the licensed frequency bands. The UE has also successfully decoded a UL grant, which schedules uplink subframe n of carrier CC2 in the unlicensed frequency bands and uplink subframe n of carrier CC3 in the unlicensed frequency bands. And then, when determining the assumed $P_{CMAX}$, scheduling conditions of three carriers should be considered. For example, when three carriers respectively belong to different bands, $$P_{CMAX\_L} = \mathrm{MIN}[10 \log_{10} \Sigma \mathrm{MIN}[p_{EMAX,c}/(\Delta t_{C,c}), p_{PowerClass}/(mpr_c \cdot a - mpr_c \cdot \Delta t_{C,c} \cdot \Delta t_{IB,c})$$
$$p_{PowerClass}/pmpr_c], P_{PwerClass}] \quad \text{Equation 1}$$

It is necessary to calculate a sum for carrier index c of each of the three carriers.

It should be noted that, it is probably that carrier CC2, and/or, carrier CC3 do not pass the CCA detection at the starting point time of subframe n. Subsequently, an uplink signal is not transmitted on a corresponding carrier. Thus, an uplink carrier, which does not transmit a signal, does not have impact on a true $P_{CMAX\_L}$ of subframe n. That is, $P_{CMAX\_L}$ is different than the assumed $P_{CMAX}$.

It should be noted that, the uplink maximum transmission power $P_{CMAX}$ (UE total configured maximum output power) may be determined by a user within a range of $P_{CMAX\_L}$ and $P_{CMAX\_H}$. That is, $P_{CMAX\_L} \leq P_{CMAX} \leq P_{CMAX\_H}$. Thus, $P_{CMAX\_L}$ may be lower, accompanying with increasing number of transmitted uplink carriers (according to intra-band CA case in 6.2.3A and 6.2.4A in TS 36.101), which means that the lower limit of $P_{CMAX}$ is reduced, instead of meaning that $P_{CMAX}$ supported by a user will be definitely reduced. For example, UE could still set the $P_{CMAX}$ for UL transmission same as assumed $P_{CMAX}$.

Similarly, the configured maximum output power per CC $P_{CMAX,C}$ may also change when the number of UL carriers in unlicensed bands changes (according to 6.2.3A and 6.2.4A in TS 36.101).

(2) The UE determines the assumed $P_{CMAX}$ and/or $P_{CMAX,C}$, based on each scheduled licensed uplink carrier.

For example, a UE determines the $P_{CMAX}$ and/or $P_{CMAX,C}$ of uplink subframe n in subframe m. Subframe m is before subframe n. However, at this time, the UE has already successfully decoded a UL grant, which schedules uplink subframe n of carrier CC1 in the licensed frequency bands. The UE has also successfully decoded another UL grant, which schedules uplink subframe n of carrier CC2 in the unlicensed frequency bands and uplink subframe n of carrier CC3 in the unlicensed frequency bands. And then, when determining the assumed $P_{CMAX}$ and/or $P_{CMAX,C}$, only scheduling condition of CC1 will be considered.

(3) The UE determines the assumed $P_{CMAX}$ and/or $P_{CMAX,C}$, based on each scheduled licensed uplink carrier and each scheduled unlicensed uplink carrier with the UCI.

For example, the UE determines the $P_{CMAX}$ and/or $P_{CMAX,C}$ of uplink subframe n in subframe m. Subframe m is before subframe n. However, at this time, the UE has already successfully decoded a UL grant, which schedules uplink subframe n of carrier CC1 in the licensed frequency bands. The UE has also successfully decoded another UL grant, which schedules uplink subframe n of carrier CC2 (CC2 carries the UCI) in the unlicensed frequency bands and uplink subframe n of carrier CC3 (CC3 does not carry the UCI) in the unlicensed frequency bands. And then, when determining the assumed $P_{CMAX}$ and/or $P_{CMAX,C}$, only scheduling conditions of CC1 and CC2 are considered.

(4) The UE determines the assumed $P_{CMAX}$ and/or $P_{CMAX,C}$ based on a carrier, which is configured by a base station and is used to calculate the $P_{CMAX}$ and/or $P_{CMAX,C}$.

For example, the base station may configure some carriers, which are used for determining the assumed $P_{CMAX}$ and/or $P_{CMAX,C}$.

Preferably, the scheduled carrier in the licensed frequency bands and the scheduled carrier in the unlicensed frequency bands with the smallest index number may be configured, so as to determine the assumed $P_{CMAX}$ and/or $P_{CMAX,C}$.

Preferably, the scheduled carrier in the licensed frequency bands and N scheduled carriers in the unlicensed frequency bands may be configured, so as to determine the assumed $P_{CMAX}$ and/or $P_{CMAX,C}$. In a special implementation mode, configure the scheduled carrier in the licensed frequency bands and N=0 carrier in the unlicensed frequency bands, so as to determine the assumed $P_{CMAX}$ and/or $P_{CMAX,C}$. That is, the UE determines the assumed $P_{CMAX}$ and/or $P_{CMAX,C}$ only based on the carrier in the licensed frequency bands. In another special implementation mode, configure the scheduled carrier in the licensed frequency bands and N=M carriers in the unlicensed frequency bands, so as to determine the assumed $P_{CMAX}$ and/or $P_{CMAX,C}$. M refers to a number of all the scheduled carriers in the unlicensed frequency bands.

Preferably, the base station may configure multiple kinds of carrier combinations, which are used for calculating the $P_{CMAX}$ and/or $P_{CMAX,C}$. The UE determines multiple sets of assumed $P_{CMAX}$ and/or $P_{CMAX,C}$, after calculating based on the configured multiple kinds of carrier combinations. For example, the base station may divide all the carriers in the unlicensed frequency bands of a UE into different groups, and indicate the UE to calculate the $P_{CMAX}$ and/or $P_{CMAX,C}$ based on transmission or not transmission of each group of carriers.

(5) The UE calculates a carrier with the $P_{CMAX}$ and/or $P_{CMAX,C}$, and determines the assumed $P_{CMAX}$ and/or $P_{CMAX,C}$ based on whether each scheduled carrier has been transmitted. In such implementation mode, the base station does not configure the assumed $P_{CMAX}$ and/or $P_{CMAX,C}$ determination mode for the UE. And the UE confirms the assumed $P_{CMAX}$ and/or $P_{CMAX,C}$ determination mode. For example, the base station has scheduled 1 carrier in the licensed frequency bands, and 2 carriers in the unlicensed frequency bands for the UE. The UE respectively determines three assumed $P_{CMAX}$ and/or $P_{CMAX,C}$, based on 1> all the three carriers have been transmitted, 2> only the carrier in the licensed frequency bands has been transmitted, 3> the carrier in the licensed frequency bands, and 1 carrier in the unlicensed frequency bands have been transmitted.

Specific implementation of block 202-3 may be as follows.

In block 202-3, the UE adjusts the transmission power of an uplink carrier, based on the priority and the assumed $P_{CMAX}$ and/or $P_{CMAX,C}$. The power adjustment mode is as follows. The UE firstly determines the uplink transmission power of each scheduled uplink carrier, which has been configured for the UE by the base station. And then, the UE compares the assumed $P_{CMAX}$ and/or $P_{CMAX,C}$ determined in block 202-2 with the uplink transmission power configured for each scheduled uplink carrier. UE compares the assumed $P_{CMAX,C}$ and uplink transmission power configured for each scheduled uplink carrier, the uplink transmission power for each scheduled uplink carrier should be the minimum of configured transmission power and assumed $P_{CMAX,C}$ (shown in Equation 2). Then, when the sum of uplink transmission power configured by the base station for each scheduled uplink carrier of the UE does not exceed the assumed $P_{CMAX}$, the UE does not need to adjust the power of uplink carrier. That is, the UE prepares the uplink channel/signal transmission for each scheduled uplink carrier, based on the power configured by the base station. When the sum of uplink transmission power configured by the base station for each scheduled uplink carrier of the UE exceeds the assumed $P_{CMAX}$, the UE performs the power adjustment and allocation, based on the priority determined in block 202-1. Specifically, different power control modes may include the same or different power adjustment modes. The power adjustment and allocation mode may be as follows.

(1) Allocate the power based on the priority. That is, sort each scheduled uplink carrier based on priority thereof. The power allocated for each of the first N channels/signals is equal to the uplink transmission power configured by the base station for each carrier. N refers to a number of uplink carriers with a higher priority, to which the power is allocated based on the uplink transmission power configured by the base station, when the $P_{CMAX}$ of current UE has not been exceeded. For the other uplink carriers, allocate the remaining power of the UE to the N+1 uplink carrier, or, allocate the remaining power to N+1 and other uplink carriers with the same priority, reduce the power of each foregoing channel/signal in equal proportion, such that the total power thereof is equal to remaining power of the UE. It should be noted that, the remaining power of the UE may be zero. At this time, the power allocated for the remaining channel/signal with lower priority is zero.

The priority criterion at least includes follows. The priority of a carrier in the licensed frequency bands is higher than that of a carrier in the unlicensed frequency bands. The power adjustment for a carrier in the licensed frequency bands is performed based on a rule defined by current standard. And the power needed by each carrier in the licensed frequency bands should be guaranteed firstly. In such case, the UE adjusts the power of a carrier in the unlicensed frequency bands, such that the sum of power of a carrier in the licensed frequency bands and power of a carrier in the unlicensed frequency bands is less than, or equal to the assumed $P_{CMAX}$ of the UE.

For an uplink carrier, power thereof may be decreased to 0 at the most based on the priority criterion, the UE may not adjust the power of such carrier. That is, the UE may maintain the power scheduled by the base station. Alternatively, the UE may determine the power of each uplink carrier, based on a result obtained after subtracting the total power of each carrier in the licensed frequency bands from the assumed $P_{CMAX}$, which may bring about the following advantages. When a carrier with higher priority in the unlicensed frequency bands cannot be transmitted due to failure of CCA, a carrier in the unlicensed frequency bands with lower priority may still be transmitted.

To better describe how to execute blocks 202-1 to 202-3, several examples are provided in the following.

A first example: the power control mode received by a UE is "determine the priority based on the carrier type" based on (3) in block 202-1, and "the UE determines the assumed $P_{CMAX}$ and/or $P_{CMAX,C}$, based on scheduling condition of each licensed uplink carrier scheduled and scheduling condition of each unlicensed uplink carrier with the UCI" according to (3) in block 202-2. In a case, the base station configures 5 carriers for the UE. There are two carriers in the licensed frequency bands, which are respectively CC1 and CC2. There are three carriers in the unlicensed frequency bands, which are respectively CC3, CC4 and CC5, and these CCs are inter-band. These five carriers are in one TAG. That is, the starting point of uplink subframe thereof is the same. The base station transmits uplink scheduling information to the UE in subframe n, schedules carrier CC1 in the licensed frequency bands to transmit PUCCH, schedules carrier CC2 in the licensed frequency bands to transmit PUSCH without UCI, schedules carrier CC3 in the unlicensed frequency bands to transmit PUSCH without UCI, and schedules carrier CC5 in the unlicensed frequency bands to transmit PUSCH with UCI. And then, the UE transmits an uplink signal of CC1/CC2 in subframe (n+4). When CC3/CC5 passes the CCA detection before subframe (n+4), the UE also transmits CC3/CC5 in subframe (n+4); otherwise, the UE does not transmit CC3/CC5. According to "determine the priority based on the carrier type" in (3) of block 202-1, the priority is CC1>CC2>CC5>CC3. On the basis of "the UE determines the assumed $P_{CMAX}$ and/or $P_{CMAX,C}$, based on scheduling condition of each licensed uplink carrier scheduled and scheduling condition of each unlicensed uplink carrier with the UCI" in (3) of block 202-2, when determining the assumed $P_{CMAX}$, take into account of CC1, CC2 and CC5. That is, calculate a sum for c=1, 2, 5 based on formula (1). Suppose the lower limit $P_{CMAX\_L}$ of $P_{CMAX}$ calculated based on formula (1) is 24, the assumed $P_{CMAX}$ of a user is 24. The power respectively allocated by the base station for CC1, CC2, CC3 and CC5 is 10, 8, 3 and 5. Since the total power 26 of CC1/CC2/CC3/CC5 exceeds the assumed $P_{CMAX}$ 24, the user does not need to adjust the power of CC1, CC2 and CC5. However, the user needs to adjust the power of CC3 to 1, such that the total power of 4 carriers does not exceed 24.

A second example: the power control mode received by the UE is "determine the priority based on type of uplink channel/signal. When the type of uplink channel/signal is the same, further determine the priority based on the carrier type" according to (2) in block 202-1. Subsequently, the priority is CC1>CC5>CC2>CC3. The power control mode received by the UE may also adopt "the UE determines the assumed $P_{CMAX}$ and/or $P_{CMAX,C}$, based on scheduling condition of each scheduled uplink carrier" according to (1) in block 202-2. That is, when determining the assumed $P_{CMAX}$ and/or $P_{CMAX,C}$, take into account of CC1/CC2/CC3/CC5. In other words, calculate a sum for c=1,2,3,5 based on formula (1). Suppose the lower limit $P_{CMAX\_L}$ of $P_{CMAX}$ calculated based on formula (1) is 20, the assumed $P_{CMAX}$ of a user is 22. The power allocated by the base station for CC1, CC2, CC3 and CC5 is respectively 10, 8, 3 and 5. Since the total power 26 of CC1/CC2/CC3/CC5 has exceeded the assumed $P_{CMAX}$ 22, the user does not need to adjust the power of CC1 and CC5. However, the user needs to adjust the power of CC2 to 7, and adjust the power of CC3 to 0. Subsequently, the total power of 4 carriers does not exceed 22.

(2) Allocate power based on the priority. When allocating the power, respectively reserve power for carriers in the licensed frequency bands and carriers in the unlicensed frequency bands. Different from (1), when allocating the power based on the priority, the total power of carriers in the licensed frequency bands does not exceed "the assumed $P_{CMAX}$-the power reserved for carriers in the unlicensed frequency bands." Similarly, the total power of carriers in the unlicensed frequency bands does not exceed "the assumed $P_{CMAX}$-the power reserved for carriers in the licensed frequency bands." Specifically, there may be multiple implementation modes to reserve power for carriers in the licensed frequency bands, and/or, carriers in the unlicensed frequency bands.

reserve power for carriers in the unlicensed frequency bands

Reserve total power for all the carriers in the unlicensed frequency bands. That is, no matter how many carriers in the unlicensed frequency bands have been scheduled, the total power reserved for carriers in the unlicensed frequency bands is the same.

Reserve power for each carrier in the unlicensed frequency bands. The power reserved for each carrier may be different, or may be the same. Calculate power necessary to be reserved, based on number of carriers in the unlicensed frequency bands scheduled each time. For example, suppose the power reserved for each carrier in the unlicensed frequency bands is P_un, when 2 carriers in the unlicensed frequency bands have been scheduled, the reserved total power is 2*P_un.

Reserve total power for each carrier group in the unlicensed frequency bands. For example, reserve total power for one PUCCH group. Alternatively, reserve total power for all the carriers in the unlicensed frequency bands of one TAG. No matter how many carriers of a group in the unlicensed frequency bands have been scheduled each time, the total power is all the same.

Reserve different power, based on different types of channels transmitted by carriers in the unlicensed frequency bands. For example, the power reserved for each carrier with the UCI in the unlicensed frequency bands is P_un_uci. The power reserved for each carrier without the UCI in the unlicensed frequency bands is P_un_nor. In a special case, P_un_nor=0, P_un_uci>0. That is, only when a scheduled carrier of the unlicensed frequency bands in the scheduled subframe includes the UCI, reserve power for such carrier; otherwise, do not reserve power.

Reserve power for carriers in the licensed frequency bands.

Reserve total power for all the carriers in the licensed frequency bands.

Reserve power for each carrier in the licensed frequency bands.

Reserve total power for each carrier group in the licensed frequency bands.

Reserve different power, based on different types of channels transmitted by carriers in the licensed frequency bands. For example, reserve different power for PUCCH, PUSCH with UCI and PUSCH without UCI. Alternatively, reserve different power for channels with the UCI (including PUCCH and PUSCH with UCI), and channels without the UCI.

When the power reserved for licensed frequency bands, or unlicensed frequency bands respectively exceeds the power configured by the base station for the licensed frequency bands or the unlicensed frequency bands, set the reserved power to be the smaller one of these two values. That is, when the power configured by the base station for the licensed frequency bands/unlicensed frequency bands<the power reserved for the licensed frequency bands/unlicensed frequency bands which is configured by the base station, the unlicensed frequency bands/licensed frequency bands may use the remaining power.

For example, the base station configures power 10, which is reserved for carrier in the licensed frequency bands. And the base station configures power 8, which is reserved for carriers in the unlicensed frequency bands. The base station adopts power 16, so as to schedule a carrier CC1 in the licensed frequency bands in subframe n. And the base station adopts power 4, so as to schedule a carrier CC2 in the unlicensed frequency bands. When the maximum power is 21, the upper limit of available power for a carrier in the licensed frequency bands is 21-min(8, 4)=17.

When determining that there is no uplink transmission for a carrier in the licensed frequency bands/carrier in the unlicensed frequency bands of a corresponding subframe, a carrier in the unlicensed frequency bands/carrier in the licensed frequency bands, which may have an uplink transmission, may borrow the reserved power of the carrier in the licensed frequency bands/carrier in the unlicensed frequency bands, e.g., a downlink subframe in the TDD configuration.

A base station may configure power for a UE, in which the power is reserved for carriers in the licensed frequency bands/carriers in the unlicensed frequency bands. The configuration signaling may be RRC high level signaling, or MAC layer signaling, or PHY layer signaling.

The power reserved for carriers in the licensed frequency bands, and/or, carriers in the unlicensed frequency bands may be a specific value, or may be a percent, e.g., may be denoted as X % of $P_{CMAX}$.

Sum of the power reserved for carriers in the licensed frequency bands and power reserved for carriers in the unlicensed frequency bands cannot exceed $P_{CMAX}$, which may be less than or equal to $P_{CMAX}$.

To better describe how to execute blocks 202-1 to 202-3, several examples will be provided in the following.

A first example: the power control mode received by the UE is "determine the priority based on the carrier type" according to (3) in block 202-1, and "the UE determines the assumed $P_{CMAX}$, based on scheduling condition of each scheduled licensed uplink carrier and scheduling condition of each unlicensed uplink carrier with the UCI" according to (3) in block 202-2. Besides, the base station configures the total power for the UE, in which the total power is reserved for all the carriers in the unlicensed frequency bands. In a case, the base station has configured 5 carriers for the UE. There are 2 carriers in the licensed frequency bands, which are CC1/CC2. There are 3 carriers in the unlicensed frequency bands, which are CC3, CC4 and CC5. These 5 carriers are in one TAG. That is, the starting point of uplink subframe thereof is the same (all the examples in the following are based on such assumed carrier configuration condition). The base station transmits uplink scheduling information to the UE in subframe n. The base station schedules carrier CC1 in the licensed frequency bands, PUCCH, carrier CC2 in the licensed frequency bands, PUSCH without UCI, carrier CC3 in the unlicensed frequency bands, PUSCH without UCI, carrier CC5 in the unlicensed frequency bands, and PUSCH with UCI. And then, the UE transmits the uplink signal of CC1/CC2 in subframe (n+4). When CC3/CC5 has passed the CCA detection before subframe (n+4), the UE also transmits CC3/CC5 in subframe (n+4); otherwise, the UE does not transmit CC3/CC5. According to "determine the priority based on the carrier type" in (3) of block 202-1, the priority is CC1>CC2>CC5>CC3. According to "the UE determines the assumed $P_{CMAX}$, based on scheduling condition of each scheduled licensed uplink carrier and scheduling condition of each unlicensed uplink carrier with UCI" in (3) of block 202-2, when determining the assumed $P_{CMAX}$, take into account of CC1, CC2 and CC5, that is, calculate a sum for c=1,2,5 based on formula (1). Suppose the lower limit $P_{CMAX\_L}$ of $P_{CMAX}$ calculated based on formula (1) is 24, the assumed $P_{CMAX}$ of a user is 24. When the total power reserved for carriers in the unlicensed frequency bands is 7, the power allocated by the base station for CC1, CC2, CC3 and CC5 is respectively 10, 8, 3 and 5. Since the total power 26 of CC1/CC2/CC3/CC5 has exceeded the assumed $P_{CMAX}$ 24, and the sum of power allocated for each carrier in the licensed frequency bands (sum of power of CC1 and CC2 is 18) has exceeded (the total power-power reserved for carriers in the unlicensed frequency bands) (24−7=17), the user does not need to adjust the power of CC1 and CC5. However, the user needs to adjust the power of CC2 to 7, and adjust the power of CC3 to 2, such that the total power of 4 carriers does not exceed 24, and the sum of power allocated for carriers in the licensed frequency bands does not exceed 17.

A second example: the power control mode received by the UE is "determine the priority based on the type of uplink channel/signal. When the type of uplink channel/signal is the same, further determine the priority based on carrier type," according to (2) in block 202-1. And then, the priority is CC1>CC5>CC2>CC3. The power control mode received by the UE may also adopt "the UE determines the assumed $P_{CMAX}$, based on scheduling condition of each scheduled uplink carrier" according to (1) in block 202-2. That is, when determining the assumed $P_{CMAX}$, CC1/CC2/CC3/CC5 is taken into account. In other words, calculate a sum for c=1, 2, 3, 5 based on formula (1). The base station has configured power 8 for the UE, in which power 8 is reserved for each carrier with UCI in the unlicensed frequency bands. When the lower limit $P_{CMAX\_L}$ of $P_{CMAX}$ calculated based on formula (1) is 22, the assumed $P_{CMAX}$ of a user is 22. The power allocated by the base station for CC1, CC2, CC3 and CC5 is respectively 10, 8, 3 and 5. Since the power allocated by the base station for CC5 is less than power 8 configured by the base station for the UE, which is reserved for each carrier with UCI in the unlicensed frequency bands, the reserved power is 5. That is, the available total power for carriers in the licensed frequency bands is 17 (22−5, instead of 22−8). Subsequently, the user does not need to adjust the power of CC1 and CC5. However, the user needs to adjust the power of CC2 to 7, and adjust the power of CC3 to 0, such that the total power of 4 carriers does not exceed 22.

In block 202-3, after calculating the uplink transmission power of each uplink carrier based on foregoing mode (1) or (2), the UE may start to prepare for a corresponding uplink transmission based on the calculated uplink transmission power. It should be noted that, regarding an uplink carrier for which the calculated power is 0, the UE still does not prepare for uplink transmission. That is, the UE gives up the uplink transmission. Alternatively, the UE still prepares for a corresponding uplink transmission, based on the power configured by the base station. However, whether to transmit is determined by block 203.

(3) Allocate the power based on the priority. Prepare multiple sets of power, on the basis of whether a scheduled carrier in the unlicensed frequency bands has been transmitted.

Determine an assumed $P_{CMAX}$, based on one of (1)~(4) in block 202-2. Determine the power adjustment of each carrier, based on such assumed $P_{CMAX}$ and various probable combinations for transmitting carriers.

Determine multiple assumed $P_{CMAX}$, based on various probable combinations for transmitting carriers mentioned in (5) of block 202-2. Determine the power adjustment of each carrier based on such combination.

In block 202-3, after calculating multiple sets of uplink transmission power for each uplink carrier based on mode (3), the UE may start to prepare multiple sets of uplink transmissions correspondingly, based on calculated uplink transmission power.

Specific implementation of block 203 may be as follows.

In block 203, the UE transmits an uplink signal, based on the adjusted uplink transmission power determined in block 202 and the $P_{CMAX}$ of uplink transmission subframes. Alternatively, the UE gives up transmitting the uplink signal. The $P_{CMAX}$ of uplink transmission subframes refers to a set $P_{CMAX}$, during the actual transmission of the UE, which may be as follows.

(a) During an actual transmission process of a UE, the set $P_{CMAX}$ must be the same as the assumed $P_{CMAX}$ in block 202-2, when determining the power of uplink channel/signal for each uplink carrier by the UE.

In such case, blocks 202-2, 202-3 and 203 may be combined. That is, after determining the priority, the UE adjusts the power of each uplink carrier, based on an actual $P_{CMAX}$. And then, the UE transmits an uplink signal based on the adjusted power, or gives up transmitting the uplink signal. That is, for a carrier in the licensed frequency bands, when the adjusted power thereof is not 0, the UE may transmit the carrier. For a carrier passing the CCA detection in the unlicensed frequency bands, when the adjusted power of the carrier is not 0, transmit the carrier. For an uplink carrier with adjusted uplink transmission power 0, give up transmitting the uplink signal thereof. Alternatively, when the remaining power is not 0, for uplink carriers with adjusted transmission power 0, transmit the uplink carriers based on a descending order of priority.

(b) During an actual transmission process of a UE, the set $P_{CMAX}$ may be greater than, or less than the assumed $P_{CMAX}$, when the UE determines the power of uplink channel/signal for each uplink carrier.

(c) During an actual transmission process of a UE, the set $P_{CMAX}$ is the minimum value of each part within one subframe. And apply the minimum value of the $P_{CMAX}$ to the whole subframe.

Here, in block 203, the UE transmits an uplink signal, based on the uplink transmission power determined in block 202 and the $P_{CMAX}$ of uplink transmission subframes, or gives up transmitting the uplink signal, which may be as follows.

(1) Under the circumstances that the set $P_{CMAX}$ during the actual transmission process of the UE is not equal to the assumed $P_{CMAX}$ in block 202, when the set $P_{CMAX}$ during actual transmission process of the UE<the assumed $P_{CMAX}$ in block 202, the UE needs to give up each carrier with a lower priority, such that the total power of each transmitted uplink carrier does not exceed the set $P_{CMAX}$ during the actual transmission process of the UE.

For example, the assumed $P_{CMAX}$ in block 202-2 only considers the carriers in the licensed frequency bands. However, during the actual transmission process, carriers in the unlicensed frequency bands may also be transmitted (which pass the CCA detection). And then, the set $P_{CMAX}$ during the actual transmission process of the UE may be less than the assumed $P_{CMAX}$ in block 202-2. Thus, for a carrier with a lower priority and a positive power value in block 202-3, there is no sufficient power to transmit such carrier. Subsequently, the UE may give up transmission of such carrier.

When the set $P_{CMAX}$ during the actual transmission process of the UE>the assumed $P_{CMAX}$ in block 202-2, the UE may transmit a carrier with power 0 calculated in block 202-3. Alternatively, when the set $P_{CMAX}$ during the actual transmission process of the UE≤the assumed $P_{CMAX}$ in block 202-2, however a carrier with a positive power value is not transmitted in block 202-3, the UE may transmit a carrier with power 0 calculated in block 202-3.

For example, when each scheduled carrier has been considered when determining the assumed $P_{CMAX}$ in block 202-2, while in the actual transmission, a carrier with higher priority in the unlicensed frequency bands does not pass the CCA detection, a carrier with lower priority passing the CCA detection may be transmitted. And then the set $P_{CMAX}$ in the actual transmission of the UE may be greater than the assumed $P_{CMAX}$ in block 202-2. Thus, when there is sufficient remaining power, the carrier with a lower priority and power 0 in block 202-3 may be transmitted.

To better describe how to execute blocks 202 and 203, several examples will be provided in the following.

A first example: the power control mode received by the UE is "determine the priority based on the type of uplink channel/signal. When the type of uplink channel/signal is the same, further determine the priority based on carrier type" in (2) of block 202-1. And then, the priority is CC1>CC5>CC2>CC3. The power control mode received by the UE may also adopt "the UE determines the assumed $P_{CMAX}$ based on scheduling condition of each scheduled uplink carrier" based on (1) in block 202-2. That is, CC1/CC2/CC3/CC5 are considered when determining the assumed $P_{CMAX}$. In other words, calculate a sum for c=1, 2, 3, 5 based on formula (1). When the lower limit $P_{CMAX\_L}$ of $P_{CMAX}$ calculated based on formula (1) is 22, the assumed $P_{CMAX}$ of a user is 22. The power allocated by the base station for CC1, CC2, CC3 and CC5 is respectively 10, 8, 3 and 5. Since the total power 26 of CC1/CC2/CC3/CC5 has exceeded the assumed $P_{CMAX}$ 22, the user does not need to adjust the power of CC1 and CC5. However, the user needs to adjust the power of CC2 to 7, and adjust the power of CC3 to 0, such that the total power of 4 carriers does not exceed 22. The UE may respectively prepare for uplink transmission of CC1, CC2, CC3 and CC5 based on power of 10, 7, 3 and 5. Suppose carrier CC5 does not pass the CCA detection, while carrier CC3 has passed the CCA detection, at this time $P_{CMAX}$ of the user may be increased to 24. Since the power of CC1 and CC2 is respectively 10 and 7, while CC5 cannot be transmitted, at this time, the remaining power 7 (24−10−7)>power 3 allocated by the base station for CC3. Thus, the UE may transmit CC3 based on power 3.

A second example: the power control mode received by the UE is "determine the priority based on type of uplink channel/signal. When the type of uplink channel/signal is the same, further determine the priority based on carrier type" in (2) of block 202-1. And then, the priority is CC1>CC5>CC2>CC3. The power control mode received by the UE may also adopt "the UE determines the assumed $P_{CMAX}$ based on scheduling condition of each scheduled licensed uplink carrier" in (2) of block 202-2. That is, CC1/CC2 is considered when determining the assumed $P_{CMAX}$. In other words, calculate a sum for c=1, 2 in formula (1). When the lower limit $P_{CMAX\_L}$ of $P_{CMAX}$ calculated based on formula (1) is 24, the assumed $P_{CMAX}$ of the user is 24. The power respectively allocated by the base station for CC1, CC2, CC3 and CC5 is 10, 8, 3 and 5. Since the total power 26 of CC1/CC2/CC3/CC5 has exceeded the assumed $P_{CMAX}$ 24, the user does not need to adjust the power of CC1, CC2 and CC5. However, the user needs to adjust the power of CC3 to 1, such that the total power of 4 carriers does not exceed 24. The UE may respectively prepare for uplink transmission of CC1, CC2, CC3 and CC5 based on the power of 10, 8, 1 and 5. Suppose carriers CC5 and CC3 have respectively passed the CCA detection, at this time the $P_{CMAX}$ of the user may be reduced to 20. And then, the total power of all the carriers has exceeded 20. Subsequently, the UE needs to give up carriers CC2 and CC3 with lower priority.

(2) When the UE has prepared multiple sets of uplink transmission power in block 202-3, in the block, the UE selects a corresponding set of uplink transmission power from the multiple sets of uplink transmission power, based on the set $P_{CMAX}$ during the actual transmission, and then performs the transmission.

It should be noted that, a possible form in communication standards is to define multiple kinds of power control modes. The priority determination mode, the assumed $P_{CMAX}$ determination mode and the power allocation mode in each power control mode is predefined. The base station indicates to adopt which kind of power control mode by using signaling. The embodiment provides multiple preferable possibilities for contents in these three parts.

For example, in the communication standards, two power control modes have been defined. In mode 1, (1) in block 202-1, (1) in block 202-2 and (1) in block 202-3 are used. In mode 2, (3) in block 202-1, (1) in block 202-2 and (2) in block 202-3 are used. The base station indicates to adopt mode 1 or mode 2 by using signaling.

In a second case, the power control indication information may be power adjustment information. The power adjustment information may be an open-loop power control parameter, and/or, a closed-loop power adjustment parameter configured by the base station for a user. For example, in TS 36.213, power of an uplink channel may be defined as follows, $$P_{PUSCH,c}(i) = \min \begin{Bmatrix} P_{CMAX,c}(i), \\ 10\log_{10}(M_{PUSCH,c}(i)) + P_{0\_PUSCH,c}(j) + \\ \alpha_c(j) \cdot PL_c + \Delta_{TF,c}(i) + f_c(i) \end{Bmatrix} \quad \text{Equation 2}$$

Some parameters are configured by the base station for a user, such as $P_{o\_PUSCH,c}(j)$. As mentioned in the foregoing first case, the uplink transmission power of each uplink carrier configured by the base station for the UE is actually the foregoing power adjustment information, which is configured by the base station for the UE. The uplink transmission power configured by the base station for the UE may be calculated based on parameters included in the power adjustment information and formula (2).

When the power control indication information only includes the power adjustment information, the power control mode is predefined, instead of being configured by the base station. For example, the standard stipulates a power control mode. For another example, the standard stipulates multiple kinds of power control modes. There is a unique determined power control mode for one scene. For example, for a user with weaker computing capability/processing capability, employ power control mode 1. For a user with stronger computing capability/processing capability, employ power control mode 2. The user may report computing capability/processing capability thereof to the base station. And then, the base station and user may determine a corresponding unique power control mode. The power control mode may be one kind of or multiple kinds of power control modes mentioned in the first case, or other current power control modes.

Other blocks in the second case are respectively the same as that in the first case.

Another implementation mode of Embodiment 1 is as follows. In block 202-2, the assumed $P_{CMAX}$ and/or $P_{CMAX,c}$ of the UE may be determined by the prior art, e.g., based on definitions for $P_{CMAX,c}$ and $P_{CMAX}$ in 6.2.5, 6.2.5A, 6.2.5C of TS 36.101 v12.7.0. And then, proceed with block 202-3, the UE adjusts the power of each uplink channel/signal, based on the priority determined in block 202-1 and $P_{CMAX}$ and/or $P_{CMAX,c}$. Subsequently, proceed with block 203. The UE transmits an uplink signal with adjusted power, or gives up transmitting the uplink signal.

During the actual transmission of the UE, stipulate that the set $P_{CMAX}$ and/or $P_{CMAX,c}$ must be the same as the assumed $P_{CMAX}$ and/or $P_{CMAX,c}$ of the UE. In such case, blocks 202-2, 202-3 and 203 may be combined. Alternatively, during the actual transmission of the UE, stipulate that the set $P_{CMAX}$ and/or $P_{CMAX,c}$ may be different from the assumed $P_{CMAX}$ and/or $P_{CMAX,c}$ of the UE. In such case, the set $P_{CMAX}$ and/or $P_{CMAX,c}$ during the actual transmission of the UE<the assumed $P_{CMAX}$ and/or $P_{CMAX,c}$ in block 202, the UE needs to give up each carrier with lower priority, such that the total power of each transmitted uplink carrier does not exceed the set $P_{CMAX}$ of the UE, and/or the power of each transmitted uplink carrier does not exceed the set $P_{CMAX,c}$ during the actual transmission.

the set $P_{CMAX}$ and/or $P_{CMAX,c}$ during the actual transmission of the UE>the assumed $P_{CMAX}$ and/or $P_{CMAX,c}$ in block 202, the UE may transmit a carrier with power 0 calculated in block 202-3. Alternatively, the set $P_{CMAX}$ and/or $P_{CMAX,c}$ during the actual transmission of the UE≤the assumed $P_{CMAX}$ and/or $P_{CMAX,c}$ in block 202, however, a carrier with a positive power value is not transmitted in block 202-3, the UE may transmit a carrier with power 0 calculated in block 202-3.

Preferably, Embodiment 1 is more applicable to a UE with lower computing capability/processing capability. That is, a period of time is needed before transmission to prepare for power adjustment. Power adjustment cannot be executed in real time, based on the $P_{CMAX}$ and/or $P_{CMAX,c}$ of actual transmission. Alternatively, the power adjustment cannot be executed within a short time, based on the $P_{CMAX}$ and/or $P_{CMAX,c}$ of actual transmission. In a more applicable scene, for example, after receiving the UL grant, the UE immediately starts to prepare for power adjustment and transmission (some UE may have to prepare the bits and power for UL signals together rather than separate processing). Of course, for a UE with higher computing capability/processing capability, the method of Embodiment 1 is also applicable.

In addition, it should be noted that, for a physical channel/signal of each uplink carrier, except for the power transition period or a system allowable power fluctuation stage (e.g., in carrier aggregation scenario, power fluctuation is allowable within 30 us at the beginning of or at the end of a subframe), the transmission power of remaining stages within one subframe should be the same.

Embodiment 2

In the embodiment, there are three modes to determine the actual transmission power of each uplink signal on an uplink carrier. A first mode is to adjust the power of each uplink signal on the uplink carrier, directly based on the priority, the assumed $P_{CMAX}$ and/or $P_{CMAX,c}$ and the actual $P_{CMAX}$ and/or $P_{CMAX,c}$ of an uplink subframe determined in real time. A second mode is to adjust the transmission power of each uplink signal on the uplink carrier, based on the priority and the assumed $P_{CMAX}$ and/or $P_{CMAX,c}$. Perform a second-time adjustment on uplink transmission power of each uplink signal on the uplink carrier, based on the adjusted uplink transmission power of each uplink carrier and the actual $P_{CMAX}$ and/or $P_{CMAX,c}$ of uplink subframe determined in real time. Transmit an uplink signal based on a result obtained after the second-time adjustment. A third mode is to adjust the power of each uplink signal on the uplink carrier, directly based on the priority and the actual $P_{CMAX}$ and/or $P_{CMAX,c}$ of uplink subframe determined in real time.

Figure 3:
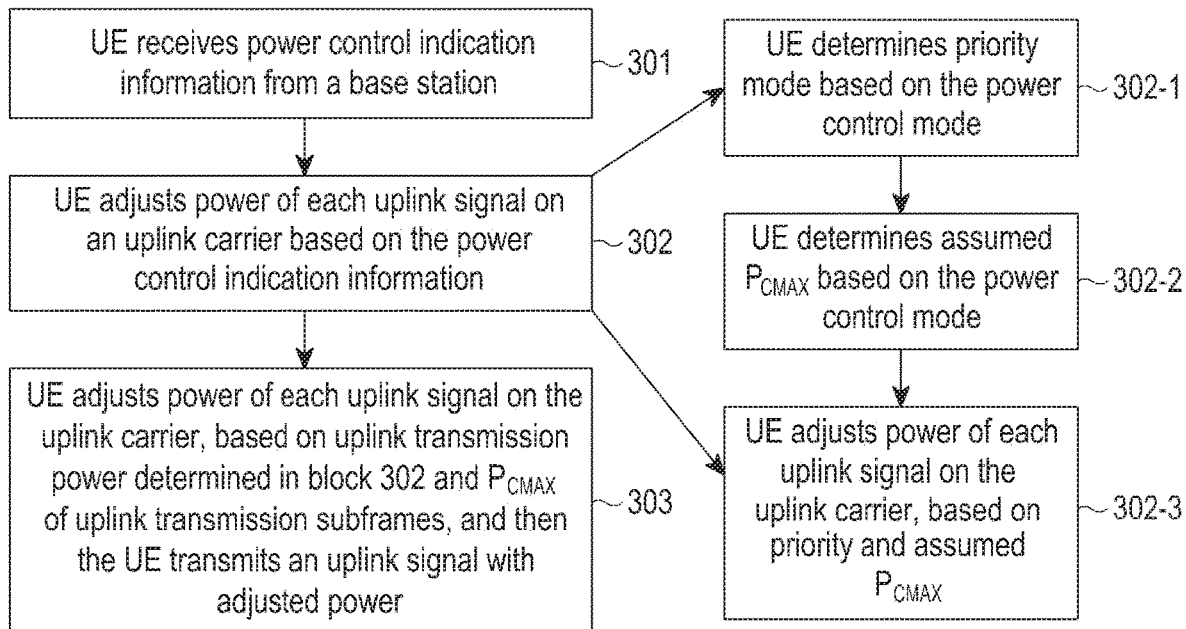
FIG. 3 is a flowchart illustrating a power control method in accordance with Embodiment 2 of the present disclosure.

FIG. 3 is a flowchart illustrating a power control method in accordance with an embodiment. As shown in FIG. 3, the method may include the following blocks.

In block 301, a UE receives power control indication information from a control node, obtains power control mode, and/or, power adjustment information.

In block 302, the UE adjusts the power of each uplink signal on the uplink carrier, based on the power control mode, and/or, the power adjustment information.

In block 302-1: the UE determines a priority mode based on the power control mode.

In block 302-2: the UE determines an assumed $P_{CMAX}$ and/or $P_{CMAX,c}$, based on the power control mode.

Either of block 302-1 and block 302-2 may be executed firstly.

In block 302-3: the UE adjusts the power of an uplink signal on an uplink carrier, based on the priority and the assumed $P_{CMAX}$ and/or $P_{CMAX,c}$.

In block 303: the UE adjusts the power of an uplink signal on the uplink carrier, based on the uplink transmission power determined in block 302 and the $P_{CMAX}$ and/or $P_{CMAX,c}$ of uplink transmission subframes. And then, the UE transmits an uplink signal by using the adjusted power.

The control node may be a base station or a UE, which plays a control role in a communication process. In the embodiment, descriptions are provided by taking the base station as the control node. Detailed descriptions about each processing in blocks 302~303 will be provided respectively in the following.

Processing in block 302-1 may be the same as that in block 202-1 of Embodiment 1, which will not be repeated here.

Specific implementation of block 302-2 is as follows.

In addition to the method described by block 202-2 in Embodiment 1, the assumed $P_{CMAX}$ and/or $P_{CMAX,c}$ determined in block 302-2 may also be determined by using the following methods.

(1) Determine the assumed $P_{CMAX}$ and/or $P_{CMAX,c}$ based on a carrier (may be one or more) in the licensed frequency bands and a carrier passing the CCA detection earliest in the unlicensed frequency bands.

(2) Determine the assumed $P_{CMAX}$ and/or $P_{CMAX,c}$ based on a carrier in the licensed frequency bands and a carrier (may be one or more) in the unlicensed frequency bands, which passes the CCA detection before the start of a subframe in a TAG with the earliest uplink transmission.

For example, the base station schedules a carrier CC1 in the licensed frequency bands and two carriers CC2, CC3 in the unlicensed frequency bands of subframe n. These three carriers respectively belong to three TAGs. The sequence of starting point of each uplink subframe is as follows. The starting point of an uplink subframe in CC2 is the earliest. The starting point of an uplink subframe in CC1 is the last. The starting point of an uplink subframe in CC3 is therebetween. That is, the carrier of the TAG with the earliest uplink transmission is CC2. Under the circumstances that CC3 passes the CCA detection earlier than CC2, and CC2 also passes the CCA detection, these three carriers need to be considered when determining the assumed $P_{CMAX}$. Under the circumstances that CC3 passes the CCA detection earlier than CC2, however, CC2 does not pass the CCA detection, CC1 and CC3 need to be considered when determining the assumed $P_{CMAX}$ and/or $P_{CMAX,c}$. Under the circumstances that CC3 passes the CCA detection later than CC2, and CC2 passes the CCA detection, when determining the power of CC2, the assumed $P_{CMAX}$ needs to take into account of CC1 and CC2. Under the circumstances that CC3 passes the CCA detection later (before the uplink transmission subframe of CC3), when determining the power of CC3 and CC1, the assumed $P_{CMAX}$ needs to take into account of CC1/CC2/CC3. Under the circumstances that CC3 does not pass the CCA detection later, when determining the power of CC1, the assumed $P_{CMAX}$ needs to take into account of CC1 and CC2.

Based on the foregoing examples, it can be seen that the assumed $P_{CMAX}$ and/or $P_{CMAX,c}$ is variable, when allocating the power for a carrier of a different TAG, under the circumstances that a scheduled carrier belongs to a different TAG, or the starting time of CCA of a scheduled carrier in the unlicensed frequency bands is different.

Based on the foregoing examples, it can be seen that the assumed $P_{CMAX}$ and/or $P_{CMAX,c}$ may be changed dynamically, when employing mode (1) or (2) in Embodiment 2. Based on each mode in block 202-2 in Embodiment 1, the assumed $P_{CMAX}$ and/or $P_{CMAX,c}$ is all the same during one transmission, which may be considered as semi-static change.

In block 302-2 of Embodiment 2, the assumed $P_{CMAX}$ and/or $P_{CMAX,c}$ of the UE may be determined based on the prior art.

Specific implementation of block 303 is as follows.

In block 303, the UE adjusts the power of an uplink signal on the uplink carrier, based on the uplink transmission power determined in block 302 and the $P_{CMAX}$ and/or $P_{CMAX,c}$ of uplink transmission subframes, and the UE transmits an uplink signal by using the adjusted power, which may be implemented by using the following modes.

(1) When the assumed $P_{CMAX}$ and/or $P_{CMAX,c}$ determination method in block 302-2 is determined by using mode (1) or (2) in the embodiment, or is determined based on the prior art (e.g., TS 36.101), blocks 302-3 and 303 may be combined. That is, the UE adjusts the power of an uplink carrier, based on the priority, the assumed maximum power and real maximum power of uplink transmission subframes. And then, the UE transmits an uplink signal based on the adjusted power, which is the foregoing first mode for determining the actual transmission power. When the power adjustment result is to adjust the power to 0, it means that no transmission is executed. It should be noted that, for a physical channel/signal of each uplink carrier, except for the power transition period or system allowable power fluctuation stage (for example, the CA allows power fluctuation around 30 us at the start of or at the end of a subframe), the power of the remaining stages within one subframe must be all the same.

A preferable implementation mode may be as follows.

Determine the $P_{CMAX,c}$ for a carrier in the licensed frequency bands, based on the priority, transmissible carriers in the unlicensed frequency bands determined before uplink transmission of carriers in the licensed frequency bands, and each carrier in the licensed frequency bands. Adjust the power of a carrier in the licensed frequency bands based on the $P_{CMAX}$ and/or $P_{CMAX,c}$.

A transmissible carrier in the unlicensed frequency bands, which is determined before uplink transmission of a carrier in the licensed frequency bands, may be a carrier in the unlicensed frequency bands, which has already been transmitted before the uplink transmission of the carrier in the licensed frequency bands, or may be a carrier in the unlicensed frequency bands, which has passed the CCA detection before the uplink transmission of the carrier in the licensed frequency bands.

Determine the $P_{CMAX,c}$ for a carrier in the unlicensed frequency bands, based on the priority, transmissible carriers in the unlicensed frequency bands determined before uplink transmission of the carrier in the unlicensed frequency bands, and each carrier in the licensed frequency bands. Adjust the power of the carrier in the unlicensed frequency bands based on the $P_{CMAX}$ and/or $P_{CMAX, c}$.

Figure 4:
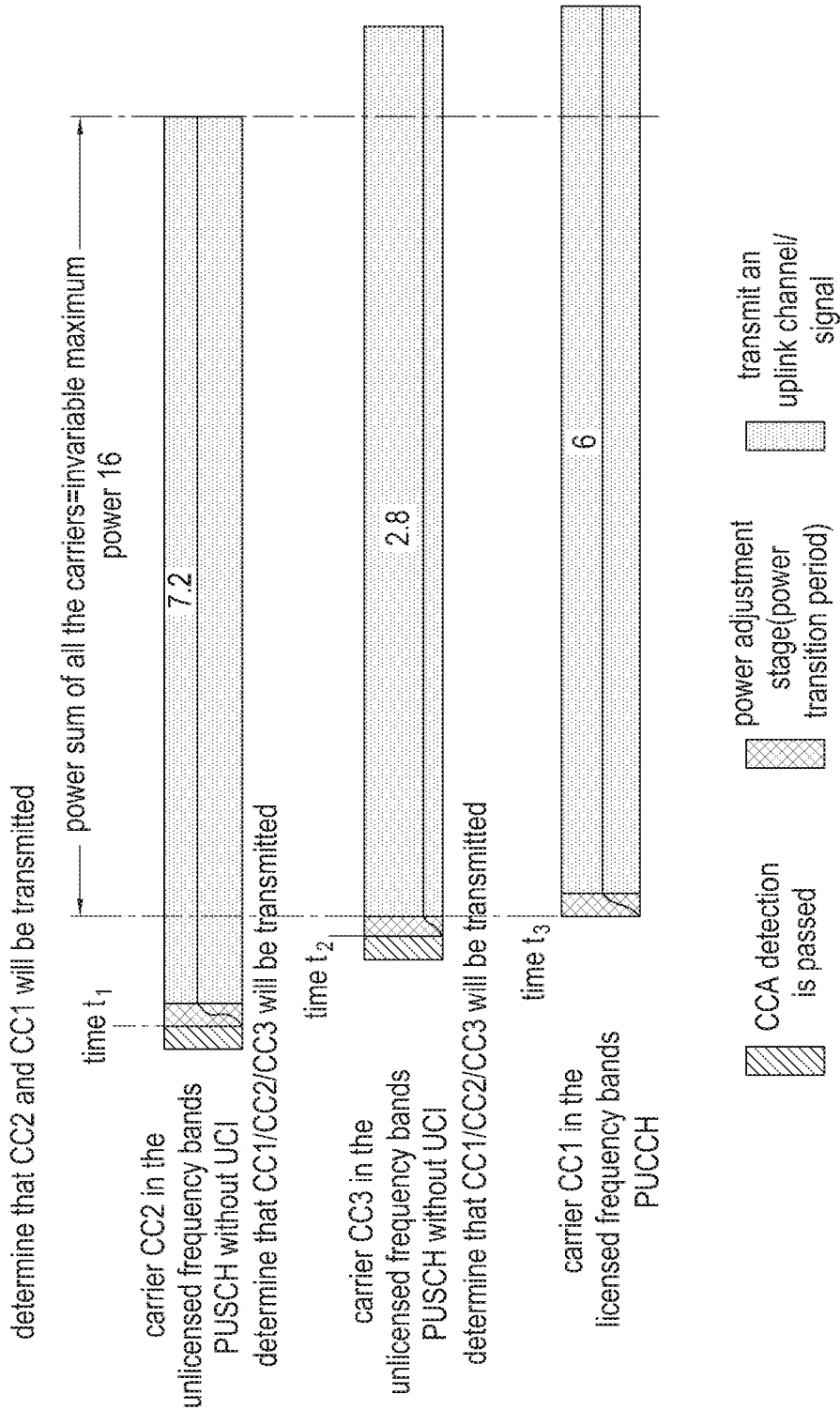
FIG. 4 is a first schematic diagram illustrating a power adjustment method in accordance with an embodiment of the present disclosure.

In mode (1), the assumed maximum power is the $P_{CMAX}$ and/or $P_{CMAX,c}$ determined at that time, which may be changed dynamically. The $P_{CMAX}$ and/or $P_{CMAX,c}$ supportable by the UE may change within one subframe, accompanying with changed number of transmissible carriers. However, it should be noted that, the $P_{CMAX}$ and/or $P_{CMAX,c}$ value in one subframe truly transmitted by the UE is all the same. For example, the base station schedules a carrier CC1 in the licensed frequency bands and two carriers CC2, CC3 in the unlicensed frequency bands of subframe n. CC1, CC2 and CC3 respectively belong to three TAGs. The sequence of starting point of uplink subframes is as follows. The starting point of an uplink subframe in CC2 is the earliest. The starting point of an uplink subframe in CC1 is the last. The starting point of an uplink subframe in CC3 is therebetween. That is, the carrier of the TAG with the earliest uplink transmission is CC2. Under the circumstances that CC3 passes the CCA detection later than CC2, and CC2 also passes the CCA detection, that is, when CC2 transmits an uplink channel (such as time t1 in FIG. 4), CC3 is not transmitted, and whether CC3 is transmissible has not been determined. And then, at this time, the assumed $P_{CMAX}$ and the determinable $P_{CMAX}$ only take into account of the impact on the maximum power, which is generated by carriers CC2 and CC1. After CC3 passes the CCA detection, at the time of transmitting CC3 (such as time t2 in FIG. 4), take into account of the impact on the maximum power generated by transmission of carriers CC1, CC2 and CC3. At this time, the assumed $P_{CMAX}$ and the determinable $P_{CMAX}$ may be reduced.

A first example is as follows. The transmission power respectively configured by the base station for CC1 PUCCH, CC2 PUSCH without UCI and CC3 PUSCH without UCI is 6, 9 and 6. The priority is determined based on "determine the priority based on the type of uplink channel/signal. When the type of uplink channel/signal is the same, further determine the priority based on carrier type" in (2) of block 202-1 in Embodiment 1. And then, the priority is CC1>CC2=CC3. Suppose the determined $P_{CMAX}$ at time t1 is 18, since power sum of three carries has exceeded 18, keep power 6 of CC1 unchanged based on the priority. Reduce respective power of CC2 and CC3 in equal proportion, such that power sum of CC2 and CC3 is 12. That is, power of CC2 and CC3 is respectively 7.2 and 4.8. And then, at time t1, transmit CC2 passing the CCA detection with power 7.2. The determined $P_{CMAX}$ at time t2 is 16. Subtract the power sum 13.2 of CC1 and CC2 from the determined $P_{CMAX}$ 16, and transmit CC3 passing the CCA detection with power 2.8. Transmit CC1 with power 6 at time t3. As shown in FIG. 3, the $P_{CMAX}$ of UE within one subframe in the example is 16, which is never changed.

When CC3 does not pass the CCA detection at time t2, CC3 cannot be transmitted. And then, the $P_{CMAX}$ of the UE in the whole subframe is 18, which is never changed. The actual transmission total power of the UE is 13.2.

Figure 5:
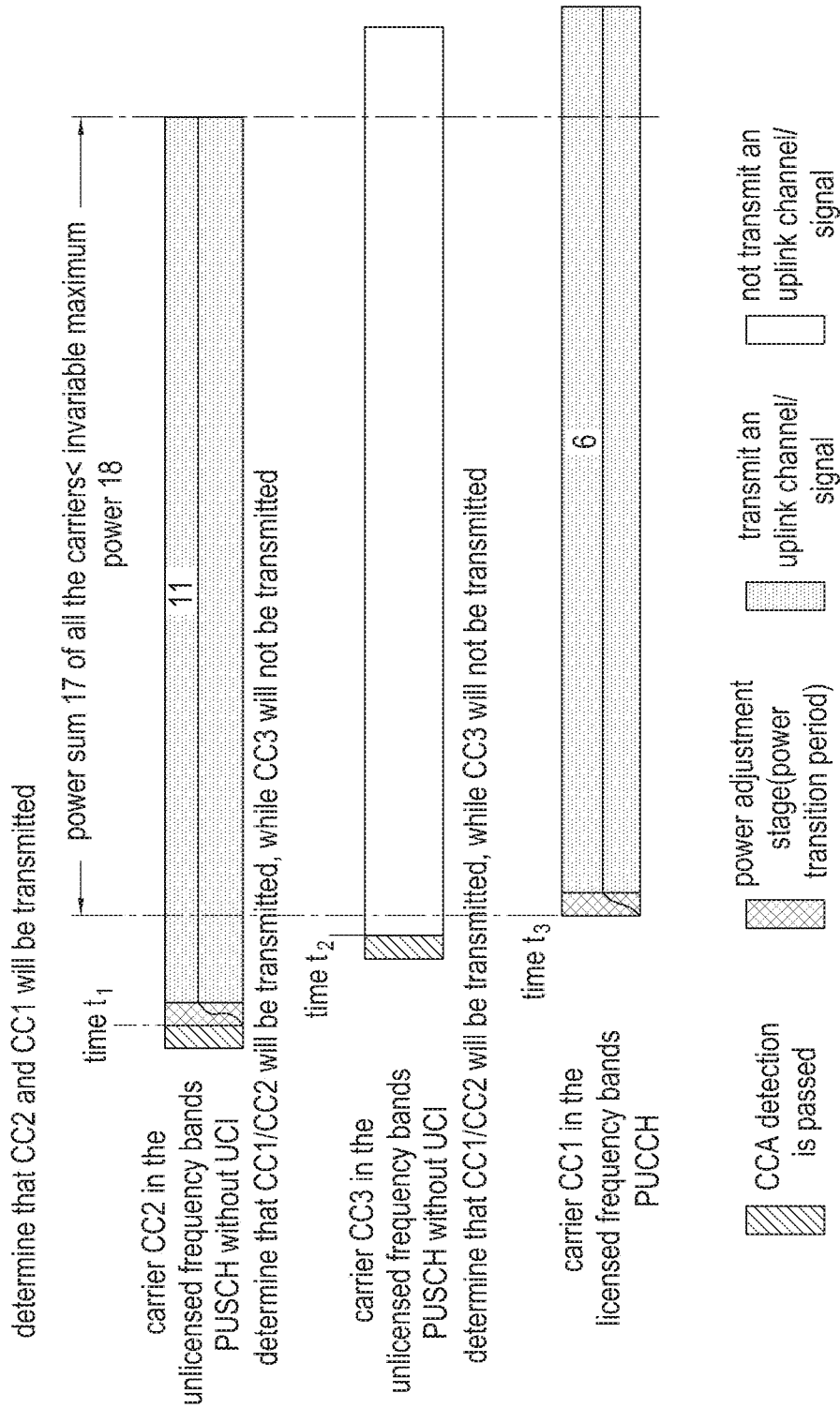
FIG. 5 is a second schematic diagram illustrating a power adjustment method in accordance with an embodiment of the present disclosure.

A second example is as follows. The transmission power respectively configured by the base station for CC1 PUCCH, CC2 PUSCH without UCI and CC3 PUSCH without UCI is 6, 11 and 6. The priority is determined based on "determine the priority based on type of uplink channel/signal. When the type of uplink channel/signal is the same, further determine the priority based on carrier type" in (2) of block 202-1 in Embodiment 1. Preferably the priority is determined by using "when the foregoing priority is the same, further determine the priority based on sequence of starting point of each uplink subframe." And then, the priority is CC1>CC2>CC3. The determined $P_{CMAX}$ at time t1 is 18. Since power sum of three carriers has exceeded 18, keep power 6 of CC1 unchanged based on the priority. The remaining power>power configured by the base station for CC2. Thus, at time t1, transmit CC2 passing the CCA detection with power 11 configured by the base station. At time t2, although CC3 has passed the CCA detection successfully, when wishing to transmit CC3, the $P_{CMAX}$ is 16, which has already exceeded the power sum of CC1 and CC2. It should be noted that, the power of CC2 cannot be changed among different subframes. Thus, CC3 cannot be transmitted. CC1 is transmitted with power 6 at time t3. As shown in FIG. 5, the $P_{CMAX}$ of the UE within one subframe in the example is 18, which is never changed. The total power during the actual transmission of the UE is 17, which is less than the maximum power. For another example, the priority is still CC1>CC2>CC3. The uplink transmission power respectively configured by the base station for CC1, CC2 and CC3 is 6, 13 and 6. The determined $P_{CMAX}$ at time t1 is 18. Since power sum of these three carriers has exceeded 18, keep power 6 of CC1 unchanged based on the priority. Reduce the power of CC2 passing the CCA detection to 12. Not transmit CC3. The $P_{CMAX}$ of UE within one subframe is 18, which is never changed. The total power during the actual transmission of the UE is also 18.

A third example is as follows. The transmission power respectively configured by the base station for CC1 PUCCH, CC2 PUSCH without UCI, CC3 PUSCH without UCI is 6, 11 and 6. The priority is determined based on "determine the priority based on the type of uplink channel/signal. When the type of uplink channel/signal is the same, further determine the priority based on carrier type" in (2) of block 202-1 in Embodiment 1. Preferably, the priority is determined based on "when the foregoing priority is the same, further determine the priority based on sequence of starting point of each uplink subframe." And then, the priority is CC1>CC2>CC3. Suppose CC2 does not pass the CCA detection before time t1, however CC3 passes the CCA detection before time t2, the UE will not transmit CC2. The $P_{CMAX}$ determined at time t2 is 18. Since power sum of CC1 and CC3 does not exceed the $P_{CMAX}$, the UE transmits CC3 with power 6 at time t2, and transmits CC1 with power 6 at time t1.

(2) The assumed $P_{CMAX}$ and/or $P_{CMAX,c}$ determination method in block 302-2 is the mode in block 202-2 in Embodiment 1, or is in the prior art (such as TS 36.101). And then, the UE may adjust the power of an uplink carrier needing power adjustment in block 303, based on the actual $P_{CMAX}$ and/or $P_{CMAX,c}$ determined in real time and the uplink power of each carrier determined in block 302. And then, the UE transmits an uplink signal with the adjusted power, which is also the foregoing second method for determining the actual transmission power.

For example, "determine the priority based on the type of uplink channel/signal. When the type of uplink channel/signal is the same, further determine the priority based on carrier type" in (2) of block 202-1 is used. Meanwhile, "the UE determines the assumed $P_{CMAX}$ and/or $P_{CMAX,c}$, based on scheduling condition of each scheduled uplink carrier" in (1) of block 202-2 is used. The base station schedules a carrier CC1 in the licensed frequency bands, two carriers CC2 and CC3 in the unlicensed frequency bands of subframe n. These three carriers respectively belong to three TAGs. The sequence of starting point of each uplink subframe is as follows. The starting point of an uplink subframe in CC2 is the earliest. The starting point of an uplink subframe in CC1 is the last. The starting point of an uplink subframe in CC3 is therebetween. That is, the carrier of the TAG with the earliest uplink transmission is CC2. Suppose the transmission power respectively configured by the base station for CC1 PUCCH, CC2 PUSCH without UCI, CC3 PUSCH without UCI is 6, 9 and 6, the priority is CC1>CC2=CC3. Suppose three carriers are all transmissible, determine that the assumed $P_{CMAX}$ is 12. And then, keep power 6 of CC1 unchanged. Respectively reduce the power of CC2 and CC3 to 3.6 and 2.4. And then, in block 303, when CC2 does not pass the CCA detection before time t1, however CC3 passes the CCA detection before time t2, determine that CC1 and CC3 are transmissible at time t2. The $P_{CMAX}$ at this time is 15. And then, it is not necessary to reduce power of CC3. CC3 may be transmitted with power 6. That is, the UE transmits CC3 with power 6 at time t2. The UE transmits CC1 with power 6 at time t3.

(3) When the priority in block 302-1 is determined based on mode (4) in block 202-1 of Embodiment 1, the UE may not execute block 302-2. That is, the UE does not need to determine the assumed $P_{CMAX}$ and/or $P_{CMAX,c}$. The UE may also not execute block 302-3. That is, the UE does not need to adjust power based on the assumed $P_{CMAX}$ and/or $P_{CMAX,c}$. Directly proceed with block 303. The UE adjusts the power of an uplink carrier, based on the actual $P_{CMAX}$ and/or $P_{CMAX,c}$ determined in real time. And then, the UE transmits an uplink signal with the adjusted power, which is the foregoing third method for determining the actual transmission power.

For example, "determine the priority based on time sequence of uplink transmission, e.g., priority of an uplink channel/signal with an earlier starting point of uplink subframe>priority of an uplink channel/signal with a later starting point of uplink subframe" in (4) of block 202-1 is used. The base station schedules a carrier CC1 in the licensed frequency bands, two carriers CC2 and CC3 in the unlicensed frequency bands of subframe n. These three carriers respectively belong to three TAGs. The sequence of starting point of each uplink subframe is as follows. The starting point of an uplink subframe in CC2 is the earliest. The starting point of an uplink subframe in CC1 is the last. The starting point of an uplink subframe in CC3 is there between. That is, the carrier of a TAG with the earliest uplink transmission is CC2. And then, the priority is CC2>CC3>CC1. The transmission power respectively configured by the base station for CC1 PUCCH, CC2 PUSCH without UCI and CC3 PUSCH without UCI is 12, 9 and 6. And then, in block 303, when CC2 does not pass the CCA detection before time t1, CC3 has passed the CCA detection before time t2, determine that CC1 and CC3 are transmissible at time t2. The $P_{CMAX}$ at this time is 15. Power sum of CC3 and CC1 configured by the base station has exceeded the $P_{CMAX}$ 15 at this time. And then, CC3 may be transmitted with power 6. Reduce the power of CC1 to 9. That is, the UE transmits CC3 with power 6 at time t2. The UE transmits CC1 with power 9 at time t3.

(4) When the priority in block 302-1 is determined by using mode (5) in block 202-1 in Embodiment 1, the UE may not execute block 302-2. That is, the UE does not need to determine the assumed $P_{CMAX}$ and/or $P_{CMAX,c}$. The UE may also not execute block 302-3. That is, the UE does not need to adjust power based on the assumed $P_{CMAX}$ and/or $P_{CMAX,c}$. Directly proceed with block 303. The UE adjusts the power of an uplink carrier, based on the actual $P_{CMAX}$ and/or $P_{CMAX,c}$ determined in real time. And then, the UE transmits an uplink signal with the adjusted power, which is the foregoing third method for determining the actual transmission power.

For example, "confirm the priority based on the time sequence for determining to execute transmission operation" in (5) of block 202-1 is used. The base station schedules a carrier CC1 in the licensed frequency bands, two carriers CC2 and CC3 in the unlicensed frequency bands of subframe n. These three carriers respectively belong to three TAGs. The sequence of starting point of each uplink subframe is as follows. The starting point of an uplink subframe of CC2 is the earliest. The starting point of an uplink subframe of CC1 is the last. The starting point of an uplink subframe of CC3 is there between. That is, the carrier of the TAG with the earliest uplink transmission is CC2. And then, the priority of CC1 is the highest. The transmission power respectively configured by the base station for CC1 PUCCH, CC2 PUSCH without UCI and CC3 PUSCH without UCI is 12, 9 and 6. And then, in block 303, when CC2 does not pass the CCA detection before time t1, however CC3 has passed the CCA detection before time t1, determine that CC1 and CC3 are transmissible at time t1. The $P_{CMAX}$ at this time is 15. Power sum of CC3 and CC1 configured by the base station has exceeded the $P_{CMAX}$ 15 at this time. And then, CC1 may be transmitted with power 12. However, power of CC3 needs to be reduced to 3. And then, the UE transmits CC3 with power 3 at time t2. The UE transmits CC1 with power 12 at time t3. For another example, when CC2 has passed the CCA detection before time t1, however CC3 does not pass the CCA detection before time t2, determine that CC1 and CC2 are transmissible at time t1. Since the starting point of uplink transmission of carrier CC1 in the licensed frequency bands is the last, determine that CC2 is transmissible before the starting point of uplink transmission of carrier CC1. Thus, the time for determining that CC1 is transmissible is the same as that for determining that CC2 is transmissible. However, since priority of channel type of CC1 is higher than that of CC2, the priority of CC1 is the highest. CC1 may be transmitted with power 12. It is necessary to reduce the power of CC2 to 3. And then, the UE transmits CC2 with power 3 at time t1. The UE transmits CC1 with power 12 at time t3.

(5) When stipulate that the assumed $P_{CMAX}$ and/or $P_{CMAX,c}$ is the same as the actual $P_{CMAX}$ and/or $P_{CMAX,c}$, not execute blocks 302-2 and 302-3. Directly adjust the power of an uplink carrier in block 303, based on the actual $P_{CMAX}$ and/or $P_{CMAX,c}$ determined in real time. And transmit an uplink signal with the adjusted power, which is the foregoing third method for determining the actual transmission power. In such case, the priority determination mode may be any mode in block 202-1 of Embodiment 1.

The differences between Embodiment 2 and Embodiment 1 are as follows. Embodiment 2 is more applicable to a UE with a stronger computing capability/processing capability or a UE supporting separate bits and power preparation. That is, a short time before transmission is needed to prepare for power adjustment. Thus, the power adjustment may be executed timely, based on the $P_{CMAX}$ and/or $P_{CMAX,c}$ of actual transmission. For example, only 20 us is necessary for the power adjustment time.

It should be noted that, Embodiment 1 and Embodiment 2 may apply to the following scene. A node in charge of transmitting a signal determines whether to transmit a signal, based on a CCA result. For example, during the uplink transmission of a LAA system, when a channel is idle, the UE determines that an uplink channel/signal is transmissible based on a CCA result at the UE side. When the uplink transmission does not rely on the CCA result at the UE side, e.g., relies on short control signaling, or relies on the CCA result obtained when the base station side transmits an uplink scheduling UL grant, the uplink power control may be executed based on the prior art.

Embodiment 3

The embodiment describes a power control method assisted by a UE's report, which includes the following blocks.

In block 401, a UE reports a processing capability of power adjustment.

The UE may report the processing capability of power adjustment by using UE capability parameters. 1 bit may be used, e.g., 0/1 state may indicate stronger or weaker capability. Alternatively, more bits may be used, so as to display more detailed processing capabilities.

In block 402: the UE receives a power control mode, which is configured by a base station based on the processing capability reported by the UE.

The base station may configure the power control mode for the UE explicitly. For example, high-level signaling configures power control indication information. The base station utilizes the power control indication information to indicate the power control mode (same as Embodiment 1). The base station may also configure the power control mode for the UE implicitly. For example, after the base station receives reported information correctly, the base station and the UE adopt a default power control mode based on a predefined rule.

In block 403: the UE transmits an uplink signal, based on the priority of each uplink carrier in the configured power control mode, and/or, the assumed $P_{CMAX}$ and actual transmission power.

The processing in block 403 may adopt the processing mode in blocks 202-203 of Embodiment 1, or blocks 302-303 in Embodiment 2, which will not be repeated here.

Another implementation method of the embodiment includes the following blocks.

In block 501: a UE reports a reference value of $P_{CMAX}$ and/or $P_{CMAX,c}$.

The UE reports the reference value of the $P_{CMAX}$ and/or $P_{CMAX,c}$, which may be an event-triggered report, or may be reported periodically.

The reference value of the $P_{CMAX}$ and/or $P_{CMAX,c}$ reported by the UE may be a backoff reference value of the maximum power, e.g. reference MPR (maximum power reduction) or A-MPR (additional MPR).

The reference value of the $P_{CMAX}$ and/or $P_{CMAX,c}$ reported by the UE may be carried by RRC high level signaling, or MAC layer signaling, or PHY layer signaling In block 502: the UE receives the assumed $P_{CMAX}$ and/or $P_{CMAX,c}$, which is configured by the base station based on the reference value reported by the UE.

In the embodiment, the assumed $P_{CMAX}$ and/or $P_{CMAX,c}$ is directly configured for the UE by the base station. The UE is not necessary to calculate the assumed $P_{CMAX}$ and/or $P_{CMAX,c}$.

In block 503: the UE determines the priority of each uplink carrier. The UE determines the actual transmission power of each uplink signal on the uplink carrier, based on the priority and the assumed $P_{CMAX}$ and/or $P_{CMAX,c}$ configured, and then transmits an uplink signal.

In the block, the UE may determine how to process the carrier priority, by using the same mode in Embodiment 1 or 2. And then, the UE determines the actual transmission power, based on the determined carrier priority and the assumed $P_{CMAX}$ and/or $P_{CMAX,c}$ configured. The mode adopted by the UE to determine the actual transmission mode may be the same as that in Embodiment 1 or 2. The differences are as follows. The assumed $P_{CMAX}$ and/or $P_{CMAX,c}$ is configured by the base station for the UE.

It should be noted that, the foregoing embodiments only discussed the following scene. That is, the uplink transmission is the PUCCH and PUSCH. However, in an actual system, the uplink transmission may be a physical random access channel (PRACH) or sounding reference signal (SRS). The priority of the PRACH in the licensed frequency bands is higher than that of any other uplink channel/signal, e.g., higher than the priority of PUCCH and PUSCH, no matter transmission time thereof is earlier or later. The priority of the PRACH in the unlicensed frequency bands may also be higher than that of PUCCH and PUSCH, or may be lower than that of PRACH and PUCCH in the licensed frequency bands, meanwhile higher than priority of any other uplink channel/signal. Alternatively, the priority of the PRACH in the unlicensed frequency bands is at least higher than that of other uplink channel/signal in the unlicensed frequency bands. The priority of the SRS is lower than that of other uplink signals.

Embodiment 4

The embodiment describes a power control method, which includes the following blocks.

In block 601, a UE receives a TAG and a timing advance (TA), which are configured by a base station. By using the configuration information of TA and TAG received by the UE, the starting point of uplink subframe of each carrier in the unlicensed frequency bands configured for the UE is not later than that of a carrier in the licensed frequency bands.

Preferably, when the base station configures the TAG and configures the TA for each TAG, stipulate by force that the TAG and TA configured by the base station must meet the following condition. The starting point of uplink subframe of each carrier in the unlicensed frequency bands is not later than that of a carrier in the licensed frequency bands. Alternatively, the TA of each carrier in the unlicensed frequency bands is not less than the TA of a carrier in the licensed frequency bands. Preferably, the base station may configure a carrier of the unlicensed frequency bands and a carrier of the licensed frequency bands in one TAG. Since each uplink carrier of one TAG takes DL timing of the same downlink carrier as a time reference, and uses the same TA, the starting point of uplink subframe of each uplink carrier within one TAG is the same.

the base station may configure a carrier of the licensed frequency bands and a carrier of the unlicensed frequency bands in different TAGs. The TA of a carrier in the unlicensed frequency bands is not less than that of a carrier in the licensed frequency bands.

In block 602: the UE receives power control indication information, and/or, power adjustment information from a control node, and obtains a power control mode, and/or, the power adjustment information.

In block 603: the UE adjusts the power of an uplink signal on the uplink carrier, based on the power control mode and/or the power adjustment information.

In block 604: the UE adjusts the power of an uplink signal on the uplink carrier, based on the uplink transmission power determined in block 603 and the $P_{CMAX}$ of uplink transmission subframes. And then, the UE transmits an uplink signal with the adjusted power.

Blocks 602-604 are respectively the same as blocks 301-303 in Embodiment 2.

To better understand the embodiment, the following example is provided.

Figure 6:
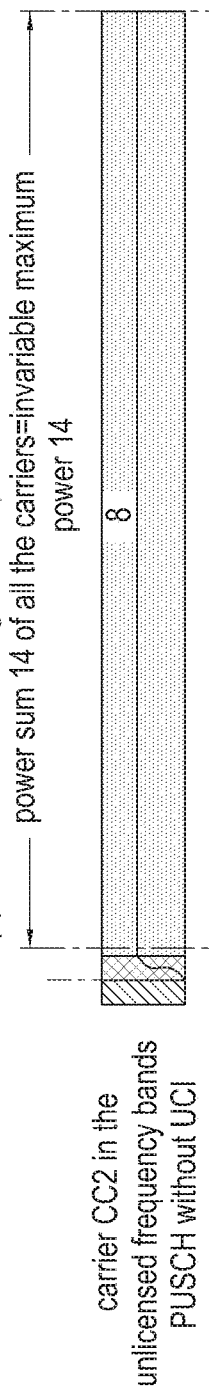
FIG. 6 is a third schematic diagram illustrating a power adjustment method in accordance with an embodiment of the present disclosure.
Figure 6:
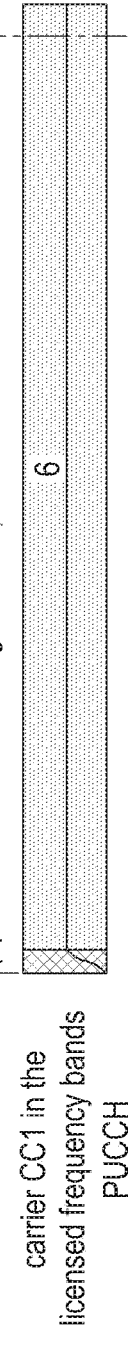
Figure 7:
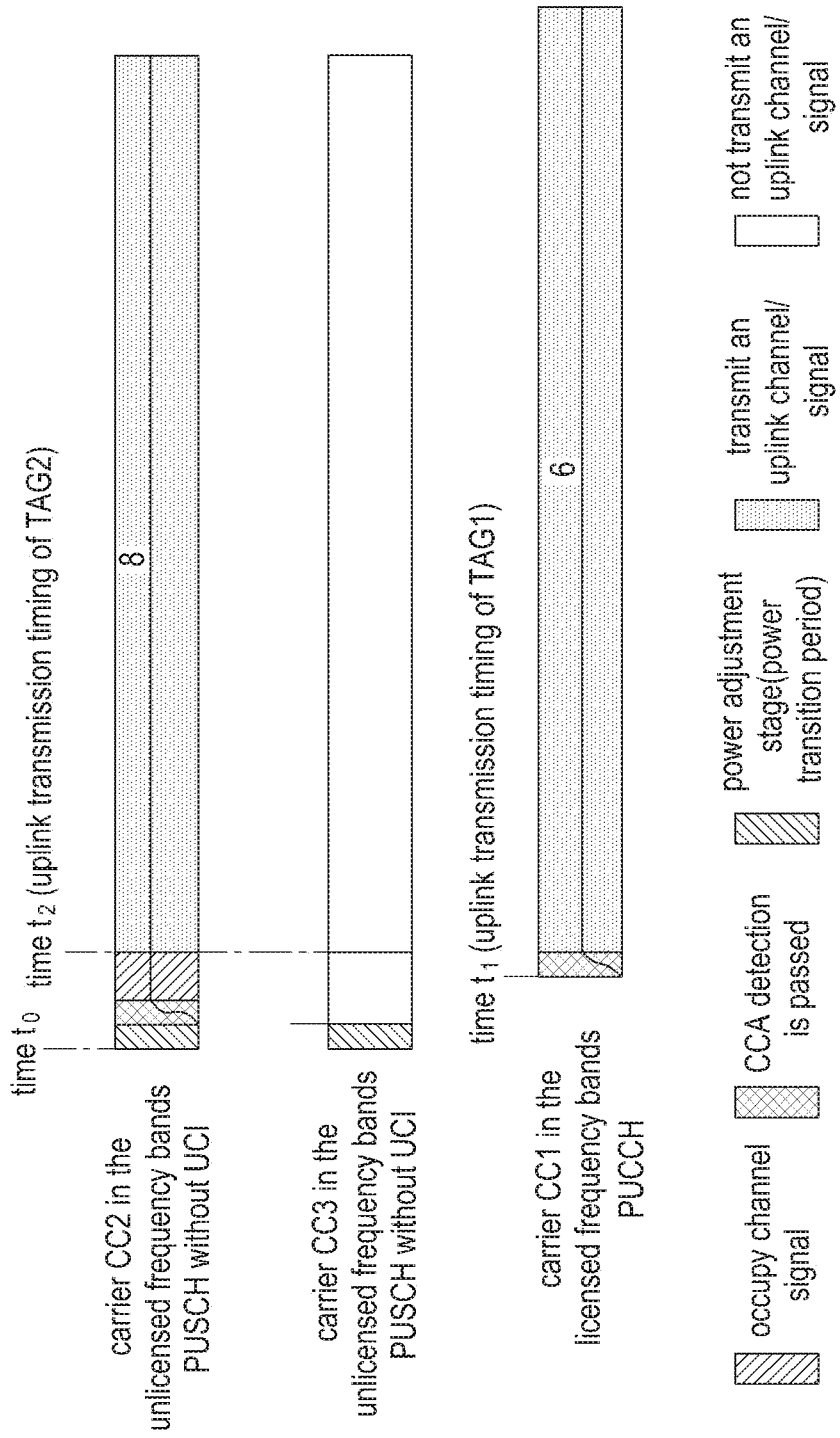
FIG. 7 is a fourth schematic diagram illustrating a power adjustment method in accordance with an embodiment of the present disclosure.

A base station has configured three uplink carriers for a UE. Carrier CC1 in the licensed frequency bands belongs to TAG1. Carriers CC2 and CC3 in the unlicensed frequency bands belong to TAG2. TA1 configured by the base station for TAG1 is less than TA2 configured by the base station for TAG2. And then, the sequence of starting point of uplink subframes is as follows. The starting point of uplink subframe of CC2 and the starting point of uplink subframe of CC3 are aligned, which are earlier than that of CC1. The base station schedules CC1, CC2 and CC3 in subframe n. The transmission power respectively configured by the base station for CC1 PUCCH, CC2 PUSCH without UCI and CC3 PUSCH without UCI is 6, 9 and 6. Suppose the priority is determined based on "determine the priority based on the type of uplink channel/signal. When the type of uplink channel/signal is the same, further determine the priority based on carrier type" in (2) of block 202-1 in Embodiment 1, the priority is CC1>CC2=CC3. CC2 has passed the CCA detection before time t1, while CC3 does not pass the CCA detection before time t1. And then, the $P_{CMAX}$ of the UE at time t1 depends on the power backoff parameter of CC2 and CC1, which is set to 14. Since transmission power sum of CC2 and CC1 configured by the base station is 15, which has exceeded the $P_{CMAX}$, reduce the power of CC2 to 8 based on the priority. And then, as shown in FIG. 6, the UE transmits CC2 with power 8 at time t1. The UE transmits CC1 with power 6 at time t2.

For another example, the transmission power respectively configured by the base station for CC1 PUSCH without UCI, CC2 PUSCH with UCI and CC3 PUSCH without UCI is 6, 9 and 6. And then, the priority is CC2>CC1>CC3. CC2 has passed the CCA detection before time t1, while CC3 does not pass the CCA detection before time t1. And then, the $P_{CMAX}$ of the UE at time t1 depends on the power backoff parameter of CC2 and CC1, which is set to 14. Since transmission power sum 15 of CC2 and CC1 configured by the base station has exceeded the $P_{CMAX}$, reduce the power of CC1 to 5 based on the priority. And then, the UE transmits CC2 with power 9 at time t1. And the UE transmits CC1 with power 5 at time t2.

For another example, the transmission power respectively configured by the base station for CC1 PUSCH without UCI, CC2 PUSCH with UCI and CC3 PUSCH without UCI is 6, 9 and 6. And then, the priority is CC2>CC1>CC3. Before time t1, CC3 has passed the CCA detection, while CC2 does not pass the CCA detection. And then, the $P_{CMAX}$ of the UE at time t1 depends on the power backoff parameter of CC3 and CC1, which is set to 15. Since transmission power sum 12 of CC3 and CC1 configured by the base station does not exceed the $P_{CMAX}$, the UE does not need to reduce the power of any CC. The UE transmits CC3 with power 6 at time t1. And the UE transmits CC1 with power 6 at time t2.

Another implementation mode of the embodiment is as follows.

In block 701, a base station configures a CCA time of a carrier in the unlicensed frequency bands for a UE, such that the CCA end time of each carrier in the unlicensed frequency bands is not later than that of a carrier in the licensed frequency bands.

Blocks 702-704 are respectively the same as blocks 602-604.

Figure 8:
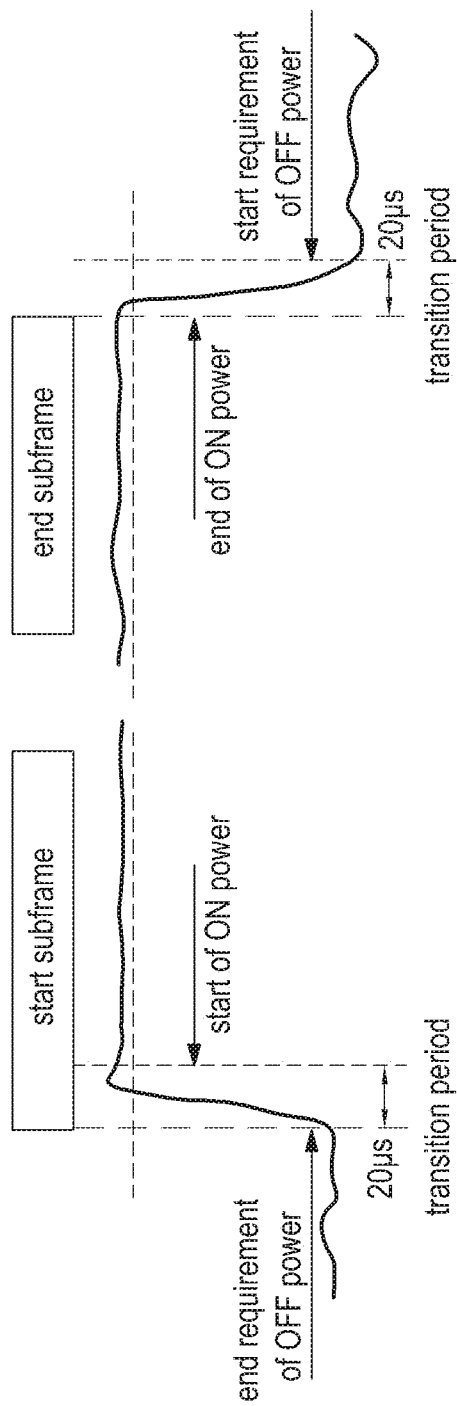
FIG. 8 is an example (coming from TS 36.101) in a power transition period.

As shown in FIG. 8, the base station has configured three uplink carriers for the UE. Carrier CC1 in the licensed frequency bands belongs to TAG1. Carriers CC2 and CC3 in the unlicensed frequency bands belong to TAG2. TA1 configured by the base station for TAG1 is greater than TA2 configured by the base station for TAG2. And then, the sequence of starting point of each uplink subframe is as follows. The starting point of an uplink subframe of CC2 and the starting point of an uplink subframe of CC3 are aligned, which is later than that of CC1. However, CCA detection time of CC2 and CC3 is earlier than TA1. And then, the UE may determine whether CC2 and CC3 are transmissible before uplink transmission of CC1. The transmission power respectively configured by the base station for CC1 PUCCH, CC2 PUSCH without UCI and CC3 PUSCH without UCI is 6, 9 and 6. The priority is determined by using "determine the priority based on the type of uplink channel/signal. When the type of uplink channel/signal is the same, further determine the priority based on carrier type" in (2) of block 202-1 in Embodiment 1. The priority is CC1>CC2=CC3. Before time t0, CC2 has passed the CCA detection, while CC3 does not pass the CCA detection. And then, the $P_{CMAX}$ of the UE at time t1 depends on the power backoff parameter of CC2 and CC1, which is set to 14. Since transmission power sum 15 of CC2 and CC1 configured by the base station has exceeded the $P_{CMAX}$, reduce the power of CC2 to 8 based on the priority. And then, as shown in FIG. 6, the UE transmits CC1 with power 6 at time t1. The UE transmits CC2 with power 8 at time t2.

Figure 9:
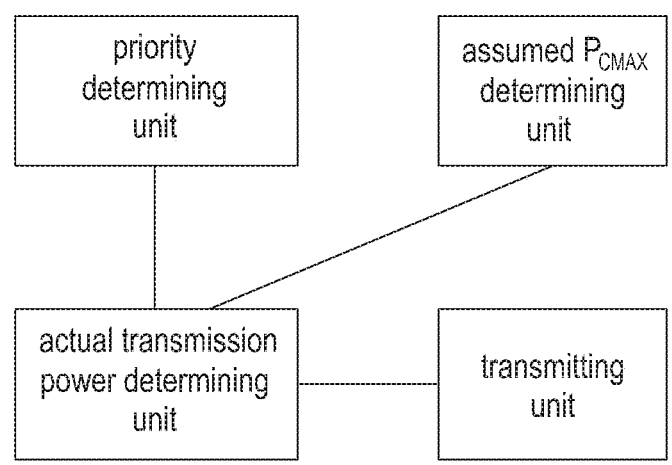
FIG. 9 is a schematic diagram illustrating a basic structure of a power control device in the present disclosure.

The foregoing describes the specific implementation of the power control method in the present disclosure. The present disclosure also provides a power control device, which may implement the foregoing power control method. FIG. 9 is a schematic diagram illustrating a basic structure of a power control device in the present disclosure. As shown in FIG. 9, the device includes a priority determining unit, an assumed $P_{CMAX}$ and/or $P_{CMAX,c}$ determining unit, an actual transmission power determining unit and a first transmitting unit.

The priority determining unit is to determine the priority of each uplink carrier, which has been scheduled within the same downlink subframe. The assumed $P_{CMAX}$ and/or $P_{CMAX,c}$ determining unit is to determine an assumed $P_{CMAX}$ and/or $P_{CMAX,c}$ of an uplink subframe, which corresponds to the downlink subframe. The actual transmission power determining unit is to determine an actual transmission power of each uplink transmission power, based on the priority and the assumed $P_{CMAX}$ and/or $P_{CMAX,c}$. The first transmitting unit is to transmit an uplink signal based on the actual transmission power.

The present disclosure also provides a control node. Basic structure of the control node includes a second transmitting unit and a receiving unit. The second transmitting unit is to issue a power control mode to a UE. The power control mode includes a priority determination mode, an assumed $P_{CMAX}$ and/or $P_{CMAX,c}$ determination mode, and/or, a power adjustment mode. The receiving unit is to receive an uplink signal from the UE. The uplink signal is transmitted, after the UE determines the actual transmission power based on the power control mode.

The foregoing is only preferred embodiments of the present disclosure, which is not for use in limiting the present disclosure. Any modifications, equivalent substitutions and improvements made within the spirit and principle of the present disclosure, should be covered by the protection scope of the present disclosure.

The invention claimed is:

1. A method for controlling power by a user equipment (UE) in a mobile communication system, the method comprising:
   identifying a total UE transmit power for uplink transmissions in a transmission occasion;
   identifying whether the total UE transmit power exceeds a configured maximum output power of the UE in the transmission occasion; and
   in case that the total UE transmit power exceeds the configured maximum output power of the UE, adjusting the total UE transmit power by allocating transmit powers to the uplink transmissions according to priorities of the uplink transmissions,
   wherein, for operation with first and second uplink carriers, the UE prioritizes power allocation for transmissions on one of the first uplink carrier or the second uplink carrier where the UE is configured to transmit a physical uplink control channel (PUCCH).

2. The method of claim 1, wherein the adjusted total UE transmit power for the uplink transmissions is smaller than or equal to the configured maximum output power.

3. The method of claim 1, wherein the UE prioritizes power allocation for transmissions on a primary cell over transmissions on a secondary cell in case of same priority order.

4. The method of claim 1, wherein the UE prioritizes power allocation for transmissions with hybrid automatic repeat request acknowledgement (HARQ-ACK) information or a scheduling request (SR) over transmissions with channel state information (CSI) or a sounding reference signal (SRS).

5. The method of claim 1, wherein the uplink transmissions include at least two of a physical uplink shared channel (PUSCH) transmission, a PUCCH transmission, a physical random access channel (PRACH) transmission, or a sounding reference signal (SRS) transmission.

6. The method of claim 5, wherein the uplink transmissions include the PUSCH transmission, the PUCCH transmission, the PRACH transmission, and the SRS transmission.

7. The method of claim 6, wherein the total UE transmit power is defined as a sum of transmit powers for the PUSCH transmission, the PUCCH transmission, the PRACH transmission, and the SRS transmission.

8. The method of claim 5, wherein the UE prioritizes power allocation for PUSCH transmission with hybrid automatic repeat request acknowledgement (HARQ-ACK) information over PUSCH transmission with channel state information (CSI).

9. The method of claim 5, wherein the UE prioritizes power allocation for PUCCH transmission with hybrid automatic repeat request acknowledgement (HARQ-ACK) information over PUCCH transmission with channel state information (CSI).

10. A user equipment (UE) in a mobile communication system, comprising:
    a transceiver; and
    at least one processor configured to:
       identify a total UE transmit power for uplink transmissions using the transceiver in a transmission occasion,
       identify whether the total UE transmit power exceeds a configured maximum output power of the UE in the transmission occasion, and
       in case that the total UE transmit power exceeds the configured maximum output power of the UE, adjust the total UE transmit power by allocating transmit powers to the uplink transmissions according to priorities of the uplink transmissions,
    wherein, for operation with first and second uplink carriers, the at least one processor is configured to prioritize power allocation for transmissions on one of the first uplink carrier or the second uplink carrier where the UE is configured to transmit a physical uplink control channel (PUCCH).

11. The UE of claim 10, wherein the adjusted total UE transmit power for the uplink transmissions is smaller than or equal to the configured maximum output power.

12. The UE of claim 10, wherein the at least one processor is further configured to prioritize power allocation for transmissions on a primary cell over transmissions on a secondary cell in case of same priority order.

13. The UE of claim 10, wherein the at least one processor is further configured to prioritize power allocation for transmissions with hybrid automatic repeat request acknowledgement (HARQ-ACK) information or a scheduling request (SR) over transmissions with channel state information (CSI) or a sounding reference signal (SRS).

14. The UE of claim 10, wherein the uplink transmissions include at least two of a physical uplink shared channel (PUSCH) transmission, a PUCCH transmission, a physical random access channel (PRACH) transmission, or a sounding reference signal (SRS) transmission.

15. The UE of claim 14, wherein the uplink transmissions include the PUSCH transmission, the PUCCH transmission, the PRACH transmission, and the SRS transmission.

16. The UE of claim 15, wherein the total UE transmit power is defined as a sum of transmit powers for the PUSCH transmission, the PUCCH transmission, the PRACH transmission, and the SRS transmission.

17. The UE of claim 14, wherein the at least one processor is further configured to prioritize power allocation for PUSCH transmission with hybrid automatic repeat request acknowledgement (HARQ-ACK) information over PUSCH transmission with channel state information (CSI).

18. The UE of claim 14, wherein the at least one processor is further configured to prioritize power allocation for PUCCH transmission with hybrid automatic repeat request acknowledgement (HARQ-ACK) information over PUCCH transmission with channel state information (CSI).

19. A method by a base station in a mobile communication system, the method comprising:
    transmitting, to a user equipment (UE), information associated with uplink transmissions in a transmission occasion; and
    in case that a total UE transmit power for the uplink transmissions exceeds a configured maximum output power of the UE in the transmission occasion, receiving, from the UE in the transmission occasion, one or more of the uplink transmissions determined according to priorities of the uplink transmissions,
    wherein, for operation with first and second uplink carriers, transmissions on one of the first uplink carrier or the second uplink carrier carrying a physical uplink control channel (PUCCH) are prioritized.

20. A base station in a mobile communication system, comprising:

a transceiver; and at least one processor configured to:

control the transceiver to transmit, to a user equipment (UE), information on uplink transmissions in a transmission occasion; and in case that a total UE transmit power for the uplink transmissions exceeds a configured maximum output power of the UE in the transmission occasion, receive, from the UE through the transceiver in the transmission occasion, one or more of the uplink transmissions determined according to priorities of the uplink transmissions, wherein, for operation with first and second uplink carriers, transmissions on one of the first uplink carrier or the second uplink carrier carrying a physical uplink control channel (PUCCH) are prioritized.

* * * * *